INVENTORS
THOMAS B. KEESLING
CLIFFORD E. KEESLING
Naylor & Neal
ATTORNEYS

INVENTORS
THOMAS B. KEESLING
BY CLIFFORD E. KEESLING
Naylor & Neal
ATTORNEYS

Nov. 3, 1970  T. B. KEESLING ET AL  3,537,662
FABRIC CUTTING AND MEASURING MACHINE
Filed May 21, 1968  16 Sheets-Sheet 10

INVENTORS
THOMAS B. KEESLING
BY CLIFFORD E. KEESLING
Naylor & Neal
ATTORNEYS

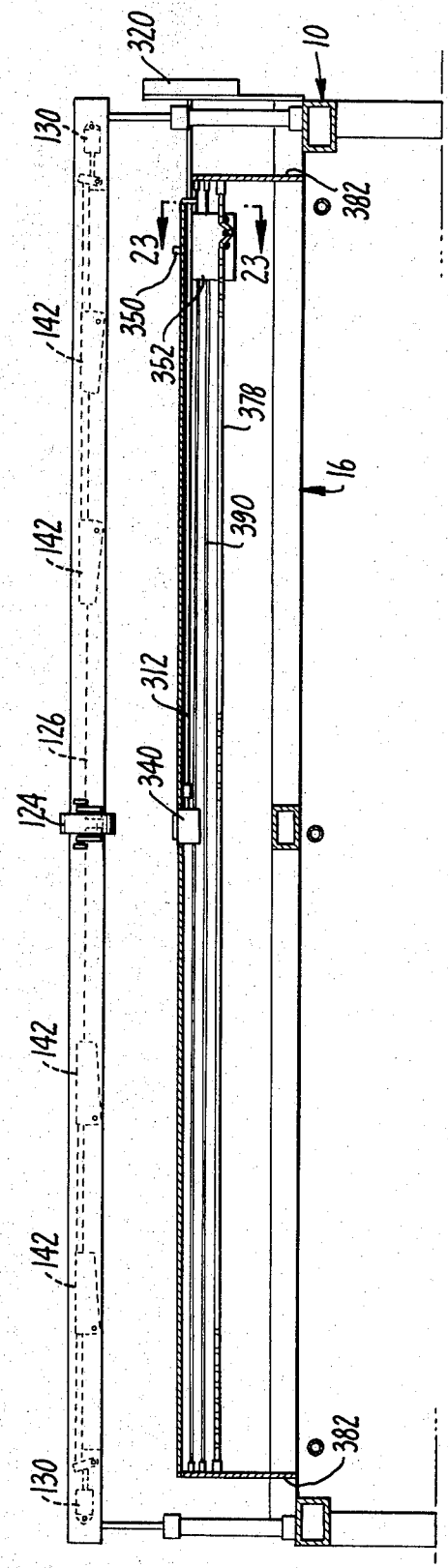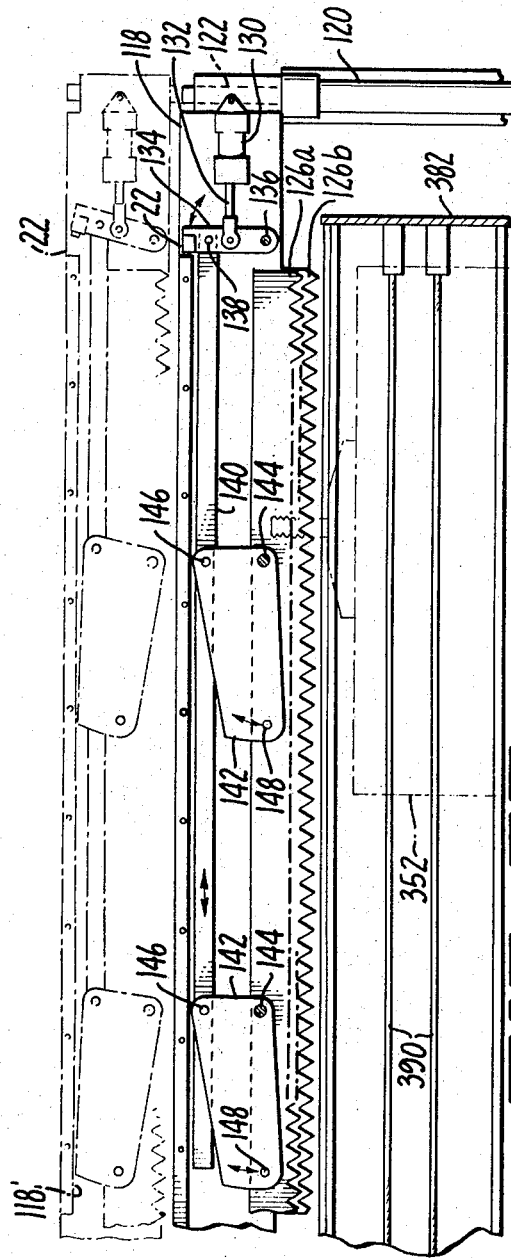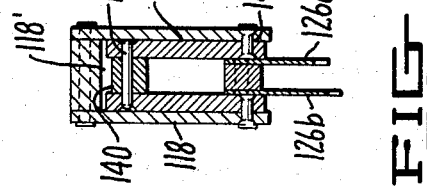

INVENTORS
THOMAS B. KEESLING
BY CLIFFORD E. KEESLING
Naylor & Neal
ATTORNEYS

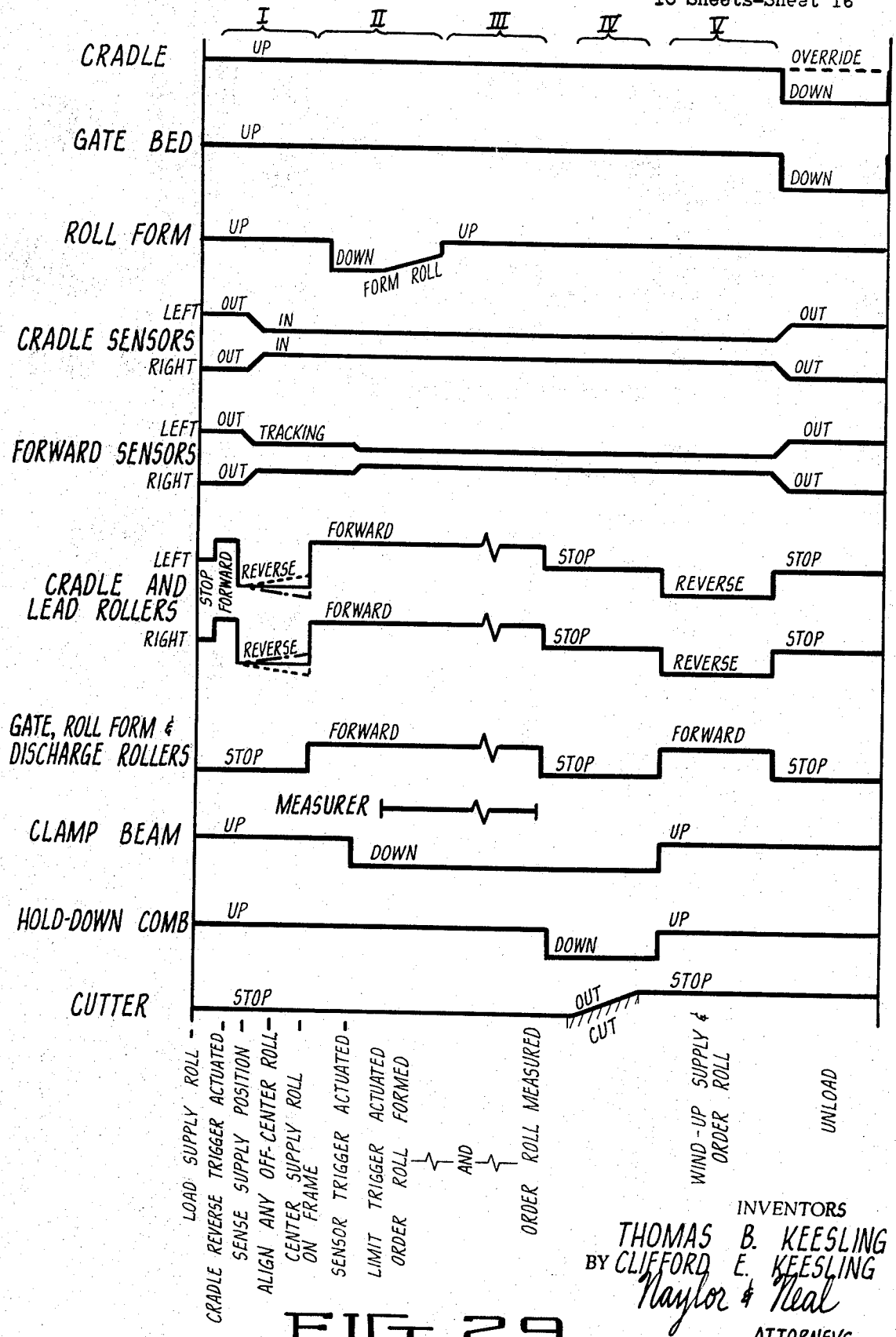

United States Patent Office 3,537,662
Patented Nov. 3, 1970

3,537,662
FABRIC CUTTING AND MEASURING MACHINE
Thomas B. Keesling, Los Gatos, and Clifford E. Keesling, San Jose, Calif., assignors to Functional Systems Corporation, Los Gatos, Calif., a corporation of Nevada
Filed May 21, 1968, Ser. No. 730,836
Int. Cl. B65h 75/02, 19/20
U.S. Cl. 242—56                             15 Claims

ABSTRACT OF THE DISCLOSURE

Apparatus for the cutting of carpet and other sheeting material in which a supply roll is placed on a conveyor system, automatically aligned and unrolled in place, measured and then cut. Thereafter the supply roll is automatically rerolled and the cut section formed into a separate roll and discharged.

BACKGROUND OF THE INVENTION

The invented machine for the cutting of rolled sheeting material greatly improves the mechanized handling of large supply rolls. The cutting machine permits the unrolling, measuring, cutting and rolling of the cut section to be performed either fully automatically or by remote control. The accuracy to which the severed section may be cut is greatly increased by the invented automatic alignment and squaring of the carpet and the improved method of measuring the desired length to be cut. Additionally, the invented machine includes an improved device for forming the cut section into a separate roll for ease of subsequent handling. The primary object of the invented machine is to permit a single operator, and in the future a programmed operation to perform all necessary operations required to measure, cut and roll the cut section. The machine disclosed in the description of the preferred embodiment presently achieves a maximum efficiency from a balanced combination of automatic and remote controls.

Prior to recent developments in mechanization, the sequences of measurement and cutting were accomplished manually. However, the operation of measurement, cutting and rolling of the cut sections of sheet material from large supply rolls becomes increasingly difficult as the width of material and the size of the supply rolls increases. Although customarily done by hand with minimal aid from mechanical equipment, the handling of large supply rolls is particularly suited for mechanized operations. Certain yard goods such as carpeting currently are manufactured in supply rolls with up to four foot diameters and fifteen foot lengths. The advantages of full mechanization are manifest.

SUMMARY

The invented machine is largely fully automated having only a few manually operated remote controls which enable efficient use of the machine in the present state of the art in handling large rolls of sheeting material. From the disclosure of the preferred embodiment, it will become apparent that the invented concepts included therein were developed with a foresight that future automated handling equipment for the operations collateral to those performed by the invented machine will enable all operations of the disclosed machine to be performed automatically. Presently, the remote controls included are largely necessary to coordinate the operations of the cutting machine with the collateral equipment currently being used.

In its preferred embodiment, the invention is a combination of hydraulic, electrical and mechanical systems. However, the choice of the particular means to perform a given function in the preferred embodiment is in no way intended to limit the invention to that means. The elements chosen for the preferred embodiment were particularly chosen with a view to ease of modification for full automation in the future.

Additionally, certain modifications to the disclosed invention may be necessary to particularly adapt the machine to the type of material handled. For example, the plurality of wheel-like rollers in the preferred embodiment comprising the conveyor system may not be as suitable for some light materials such as cloth as would be a conveyor system comprised of conveyor belts.

The preferred embodiment disclosed was particularly designed for the handling of carpets. The novel concepts therein embodied are not, however, limited to such material. With minor modifications, the disclosed machine will perform equally well on rolled sheet metal, fabrics, plastics, and a variety of other materials.

The invention provides a novel method of aligning a supply roll of sheeting material placed in a cradle such that when unrolled by peripheral rotation from the action of an underlying conveyor system, the sheeting will be centered over and perpendicularly transverse to the path of a cutting tool. Initial alignment of the supply roll in the cradle is accomplished by splitting the underlying conveyor system into two separate sections operating on each end of the rolled carpet. Driving one of the conveyor sections at a greater speed than the other will cause the rotating supply roll to skew such that the rotation becomes relatively helical, thereby creating a lateral displacement of the roll. The skew may also be caused by other mechanical means so that rotation of the skewed roll causes longitudinal conveying of the roll.

Activation of this conveyor differential is best accomplished by sensors that converge from the opposite outer edges of the cradle. The sensors may be optical "electric eyes" or mechanical wands or trip switches. The first of the uniformly converging sensors to detect the end of the supply roll will activate the differential drive to shift the roll away from the activated sensor. This adjustment process will continue until both sensors detect the supply roll which will indicate that the roll is centered.

The supply roll is placed on the cradle to unroll from the bottom thereby maintaining a continuous peripheral contact with the conveyor systems during the unroll operation. To prevent unroll during the operation of centering the supply roll in the cradle, the conveyor systems in the cradle are driven in a reverse direction.

To insure that the unrolled sheeting continues in the center of the conveyor systems such that a cut will be "square" a pair of forward sensors mounted near the cutting tool converge and detect any off center of the unrolled sheeting. By a similar activation of the proper differential in conveyor sections, the unrolled sheeting will be centered.

The invention disclosed also includes a novel arrangement of apparatus for accurate measurement of the sheeting. Basically, a trip switch or optical sensor located a predetermined distance from the path of the cutting tool activates the pulse addition of electrical pulses developed from a light receiving sensor. The sensor is activated by a beam flashing through a perforated shutter wheel. The rotating shutter wheel is driven by the action of the unrolled sheeting on an underlying thin tracking belt. The movement of the sheeting, firmly pressed against the belt, drives a drum to which the shutter wheel is connected. The equidistant perforations represent units of distance the sheeting has traveled. With proper calibration, this distance may be numerically represented in the output of an electronic pulse adder. By electronic comparison with a desired input length, the conveyor system may be automatically stopped when the length desired is reached and the sheeting thereon cut by a transversely traveling cutting tool.

To reduce the length of the conveyor system, the portion of the sheeting to be severed is continuously re-rolled into a separate roll by an order roll forming mechanism. This also advantageously permits the sheeting to be subsequently handled in the convenient form of a roll when discharged from the cutting machine.

The formation is accomplished by the action of two conveyor beds mounted on extending arms that converge on the end of a flat, downward-slanted discharge bed. One coming from underneath the discharge bed forms a lip or gate that causes the lead edge of the discharged sheeting to raise. The other converges from the top and with the gate bed creates a pocket forcing the raised edge of the sheeting to curl and roll onto itself.

When the initial formation of the sheeting reaches a stage such that the roll will continue to form without the aid of the top conveyor bed, the top extension arm is raised. After the roll of the severed sheeting is completed, the gate bed is lowered and the roll of sheeting will fall from the discharge bed.

Other novel concepts in the invented machine will become apparent on consideration of the disclosure of the preferred embodiment in the specification. The description of the preferred embodiment is particularly directed to a machine for cutting carpet. However, this particular use and the detail to which the description is devoted are not intended to limit the scope of the invention as defined by the claims. They are intended only to fully set forth what is considered to be the preferred embodiment, for what currently appears to be the principal use of such a machine in the industry.

Modifications and additional uses within the scope of this invention will become apparent from the full consideration of the specification and accompanying drawings, in which:

FIG. 20 is a vertical front section of the cutting apparatus taken on the line 20—20 in FIG. 3;

FIG. 21 is an enlarged vertical section of the clamp beam taken along line 21—21 in FIG. 3;

FIG. 22 is a fragmentary vertical side section of the clamp beam and plate taken on line 22—22 in FIG. 3;

FIG. 29 is a time-sequence diagram for a complete cutting cycle.

Figure 1:
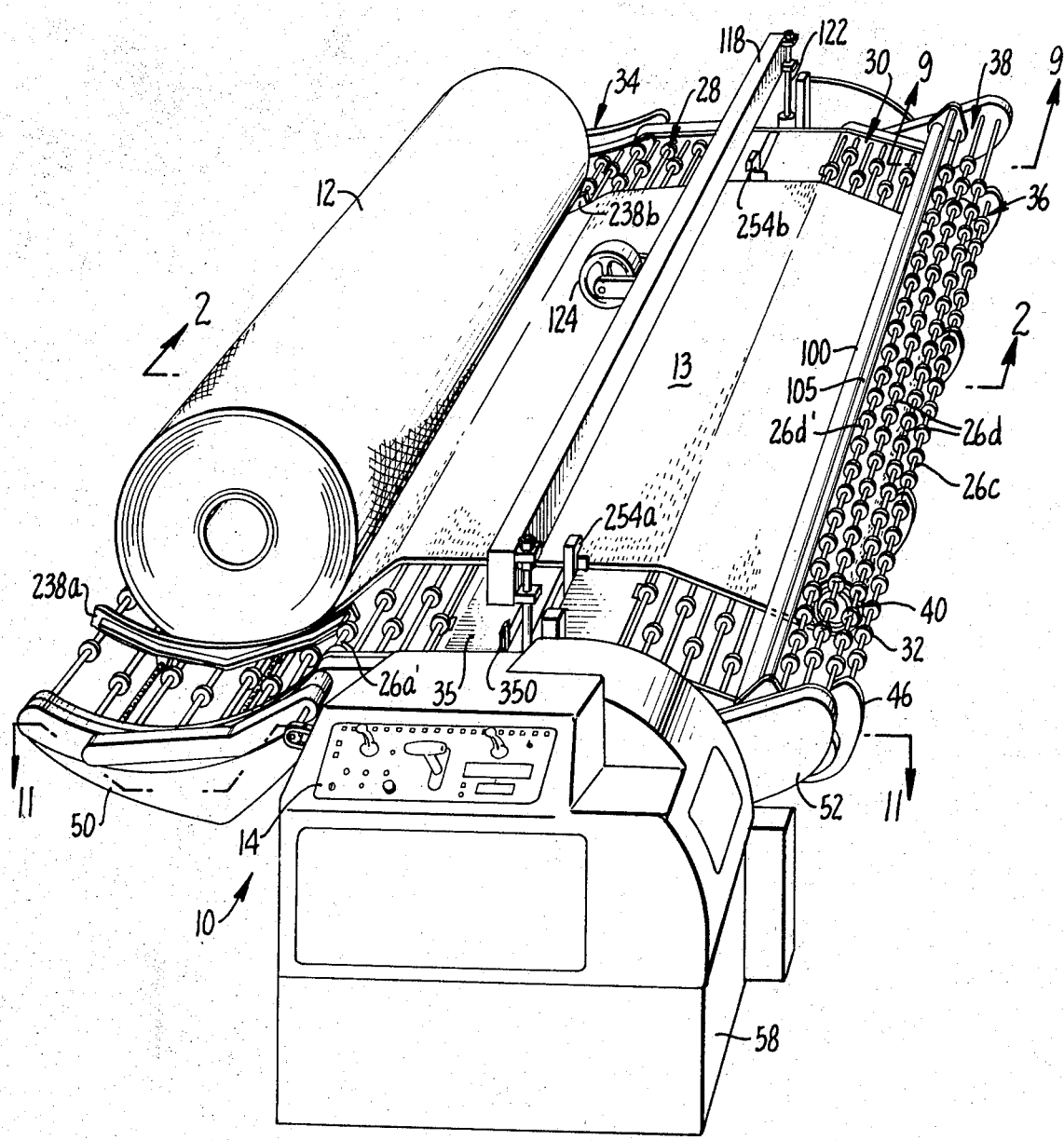
FIG. 1 is an overall perspective view of the complete carpet cutting machine carrying a partially unrolled carpet.

Turning now in particular to FIG. 1, therein is illustrated a schematic view of a cutting machine 10 in operation, particularly adapted for the cutting of carpet. Once a supply roll 12 of carpet is placed on the machine, all operations in cutting the carpet 13, rolling the cut section and rerolling the supply roll 12 are performed either automatically or are monitored from a central control panel 14 by a single operator. Because of the complexity of the carpet cutting machine 10, the structural and mechanical disclosure of the preferred embodiment will be divided into several separate sections for clarity of description.

FRAME AND ROLLER BEDS

Figure 2:
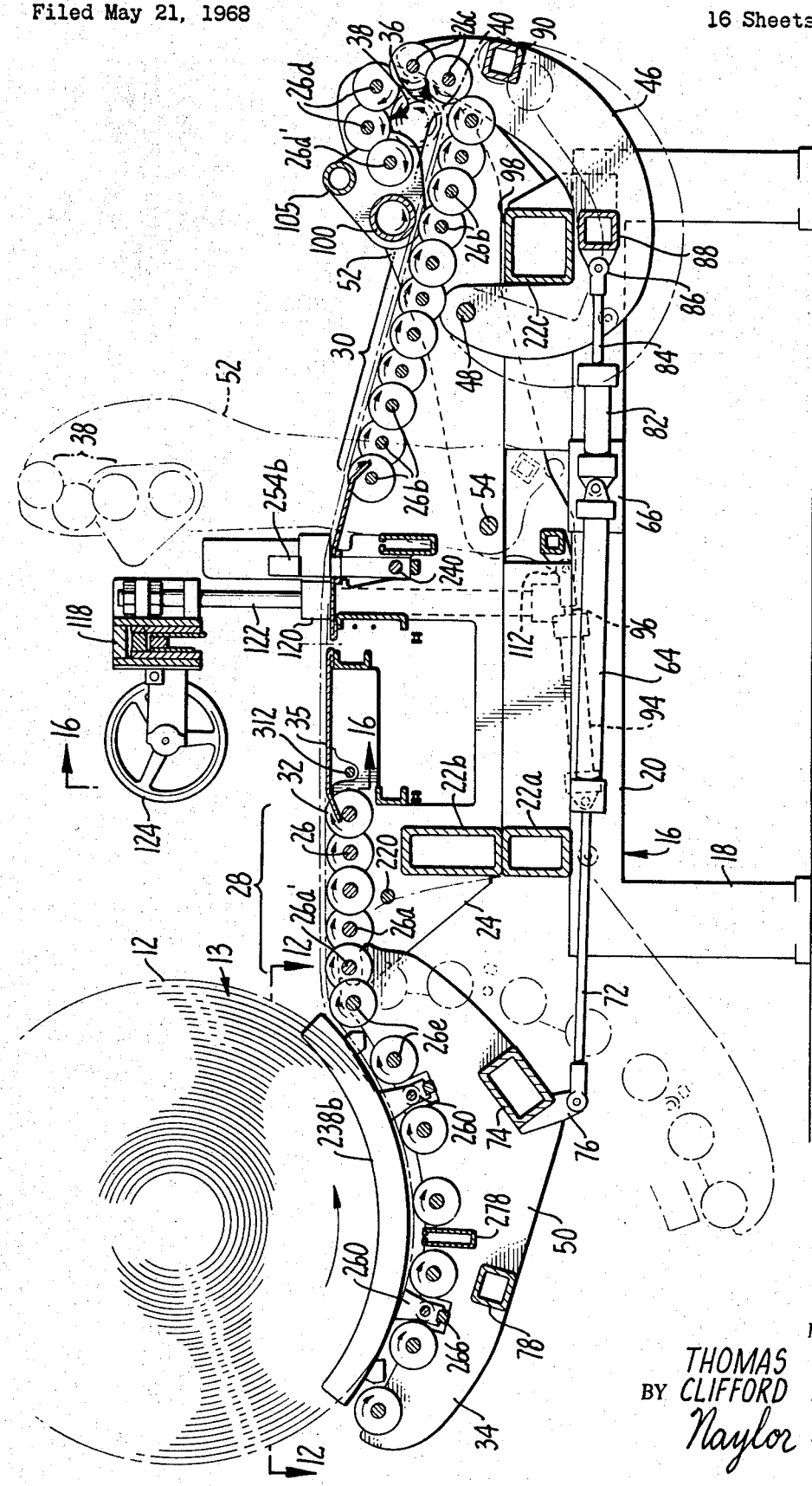
FIG. 2 is a side section of the carpet cutting machine taken on the line 2—2 in FIG. 1.
Figure 11:
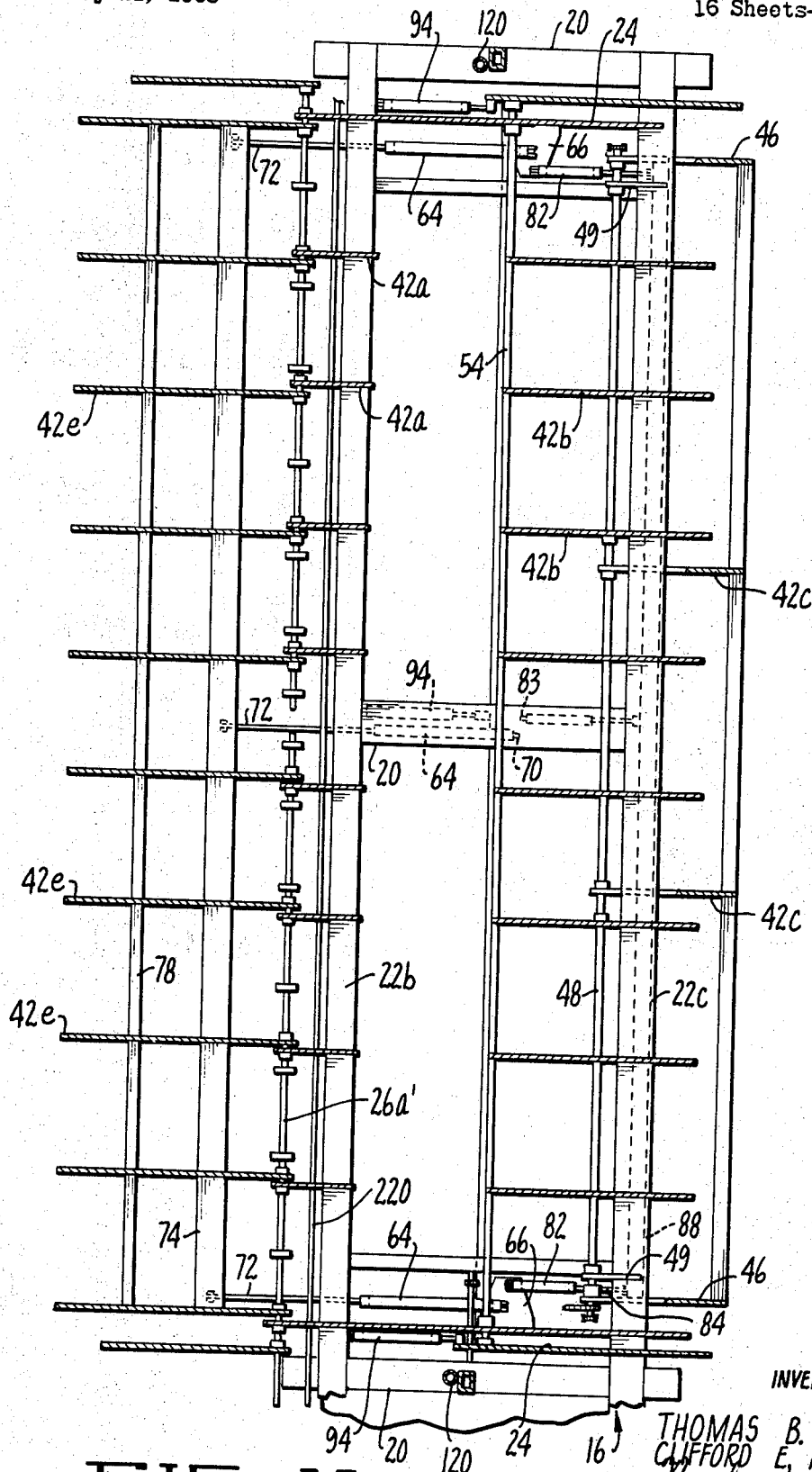
FIG. 11 is a partial plan section taken on the line 11—11 in FIG. 1.

The apparatus for carpet cutting is supported on a table-like main frame 16 as illustrated in FIG. 2. The frame 16 is comprised of four legs 18 supporting three cross-members 20. Longitudinal beams 22a, b, c also illustrated in the exploded view of FIG. 8, run the width of the machine, and may vary in length depending on the largest width of carpet desired to be handled. In the present embodiment of the carpet cutting machine 10 these longitudinal beams 22a, b, c are in excess of fifteen feet to handle the largest width carpet generally manufactured. The relative length of the longitudinal beams 22b, c is illustrated in FIG. 11. Since the carpet cutting machine 10 can handle any smaller width carpet down to twenty-seven inches, a machine of smaller design width would be advantageous only in the initial capital outlay and in the relative space saved by a smaller machine where exclusively, carpet of width less than fifteen feet is cut.

At each side of the cutting machine 10 fixed to the longitudinal beams are mounted a plurality of side plates 24, FIG. 2. The side plates 24 provide a bearing mount for two sets of fixed position roller shafts 26. The set of roller shafts 26a nearer the supply roll 12 of carpet forms a lead bed 28. The other set of roller shafts 26b forms a discharge bed 30. On each shaft, exemplar 26, are fixed numerous identically shaped rollers, exemplar 32, FIG. 2. Although the material from which the rollers 32 are made may differ according to the type of sheet material for which the cutting machine is used, it has been found that a rigid material is most suitable for use in carpet cutting. A rigid material will not contribute inaccuracies to the measuring operation as might an elastomeric material. However, if the material to be cut is, for instance, sheet metal, the frictional characteristics of a rubber material would be preferable. In the preferred embodiment of the carpet cutting machine, the rollers 32 are of a hard plastic material with the peripheral roller surface transversely notched, much like a gear. Each roll is about four inches in diameter and one inch in width.

The supply roll 12 of carpet rests in an arc-shaped cradle 34 on rollers 32 identical to those comprising the lead bed 28 and the discharge bed 30. As carpet is unrolled across the lead bed 28, it crosses a flat plate bed 35, FIG. 2, which serves as a cutting platform for the cutting operation. Thereafter, the carpet rides over a discharge bed and then strikes rollers 32 mounted on a set of two roller shafts 26c which forms a gate bed 36. The rollers 32 in the gate bed 36 tend to raise the end of the carpet 13 and with the aid of rollers 32 fixed to three roller shafts 26d comprising a roll form 38, the carpet 13 is turned over upon itself commencing the formation of an order roll 40 of carpet.

Figure 3:
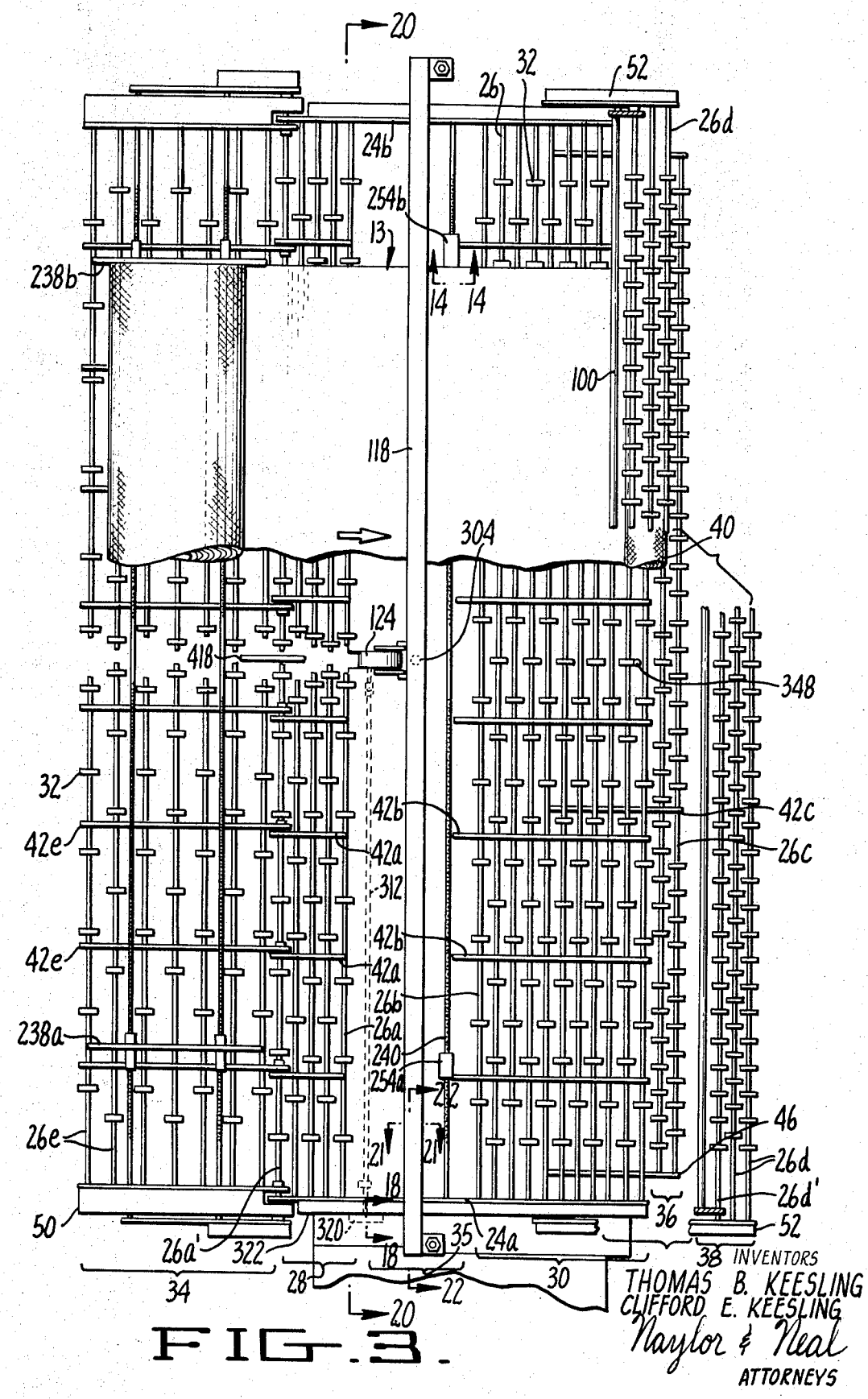
FIG. 3 is an overall plan view of the carpet cutting machine in FIG. 1.

Turning to FIG. 3, the arrangement of roller shafts 26 and rollers 32 is more clearly depicted. For additional clarity, the roll form 38 has in part been broken (see brackets) and extended beyond its true position to reveal the arrangement of the underlying discharge bed 30 and gate bed 36. In all but the cradle 34, the roller shafts 26 are spaced less than a roller diameter apart. When the rollers 32 on each adjacent roller shaft 26 are attached in a staggered fashion, examination of FIG. 2 illustrates a near continuity of surface movement over the rollers is obtained.

Since the distance from side plate 24a to side plate 24b is in excess of fifteen feet, the roller shafts 26 are intermittently supported by numerous bearing jigs 42 (FIG. 11). Eight bearing jigs 42b support the roller shafts 26b comprising the discharge bed 30. Each bearing jig 42 contains an array of bearings, exemplars 44 shown in FIG. 7, through which the roller shafts 26 pass.

Additionally, eight bearing jigs 42a support the roller shafts 26a comprising the lead bed 28. The roller shafts 26a in the lead bed 28 are broken at midpoint, as illustrated in FIG. 3, for separate drive to each side for a supply roll alignment sequence hereafter described. The bearing jigs 42 for both the lead bed 28 and the discharge bed 30 are fixed to the longitudinal beams 22b and c, respectively, on the frame 16 as illustrated in FIG. 11.

Two bearing jigs 42c provide support for the roller shafts 26c forming the gate bed 36. Like the two end plates forming gate arms 46 the bearing jigs 42c are attached to a pivot shaft 48, illustrated in FIGS. 2 and 11. The pivot shaft 48 is supported on some of the bearing jigs 42b and on additional bearing brackets 49 as shown in FIG. 11.

Figure 8:
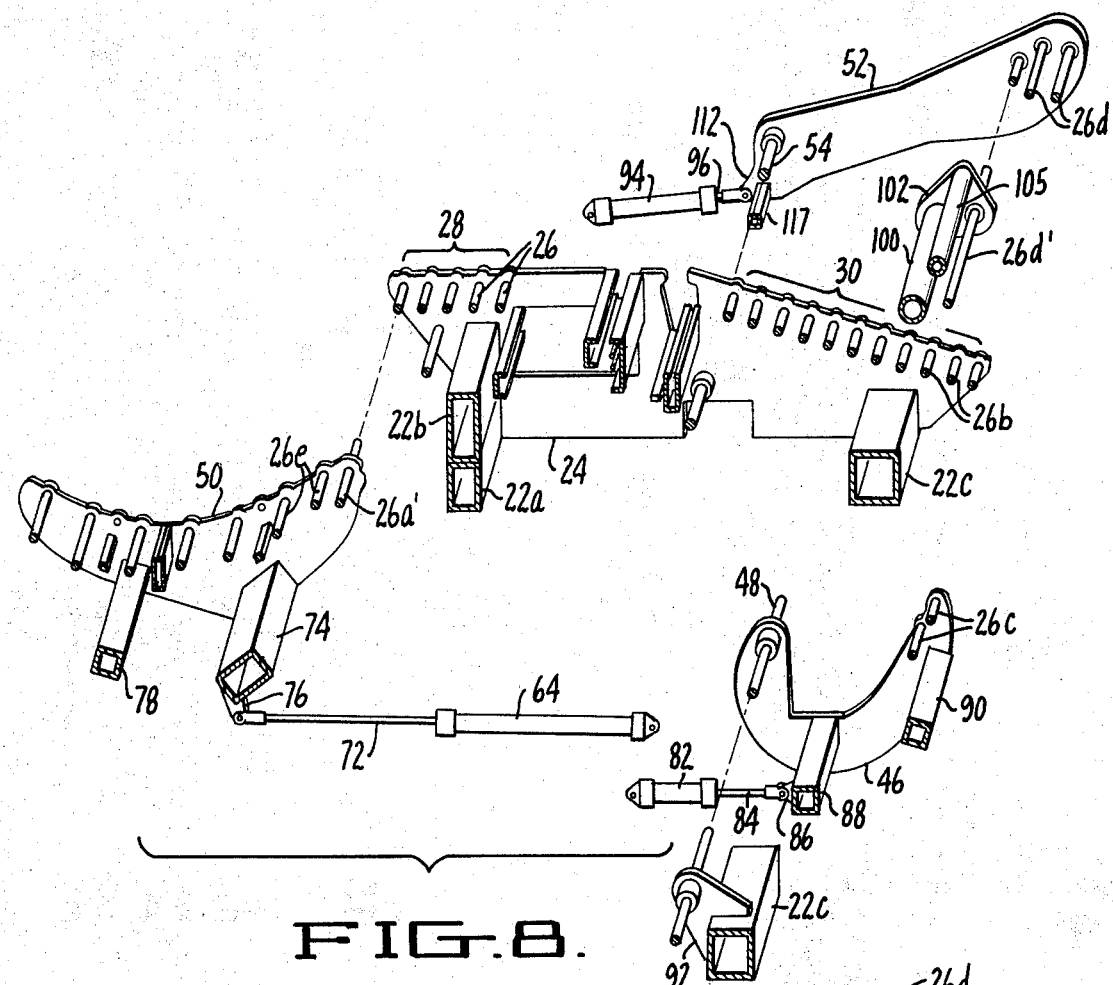
FIG. 8 is an exploded view of the side plate and arms at one side of the cutting machine to which the ends of the roller shafts are mounted.

Eight bearing jigs 42e support roller shafts 26e comprising the cradle 34 for the supply roll of carpet. These bearing jigs 42e and two cradle arms 50 at the ends of the roller shafts 26e are pivotally mounted to the foremost roller shaft 26a' in the lead bed 28 as illustrated in FIGS. 3, 8 and 11.

The structural requirements of the roll form 38 do not require the insertion of bearing jigs. The roll form does not support any weight of the carpet, but merely shapes the discharged carpet into an order roll 40. The entire length of each roller shaft 26d in the roll form 38 is supported only at the ends by a roll form arm 52, FIG. 3, which is pivotally mounted to an axle 54 that passes through the bearing jigs 42b that support the discharge bed 30, and through the side plates 24, as illustrated in FIG. 8 and FIG. 11. To reduce bowing along the length of the roller shafts 26d in the roll form, the shafts are slightly increased in diameter.

HYDRAULIC SYSTEM

Figure 28:
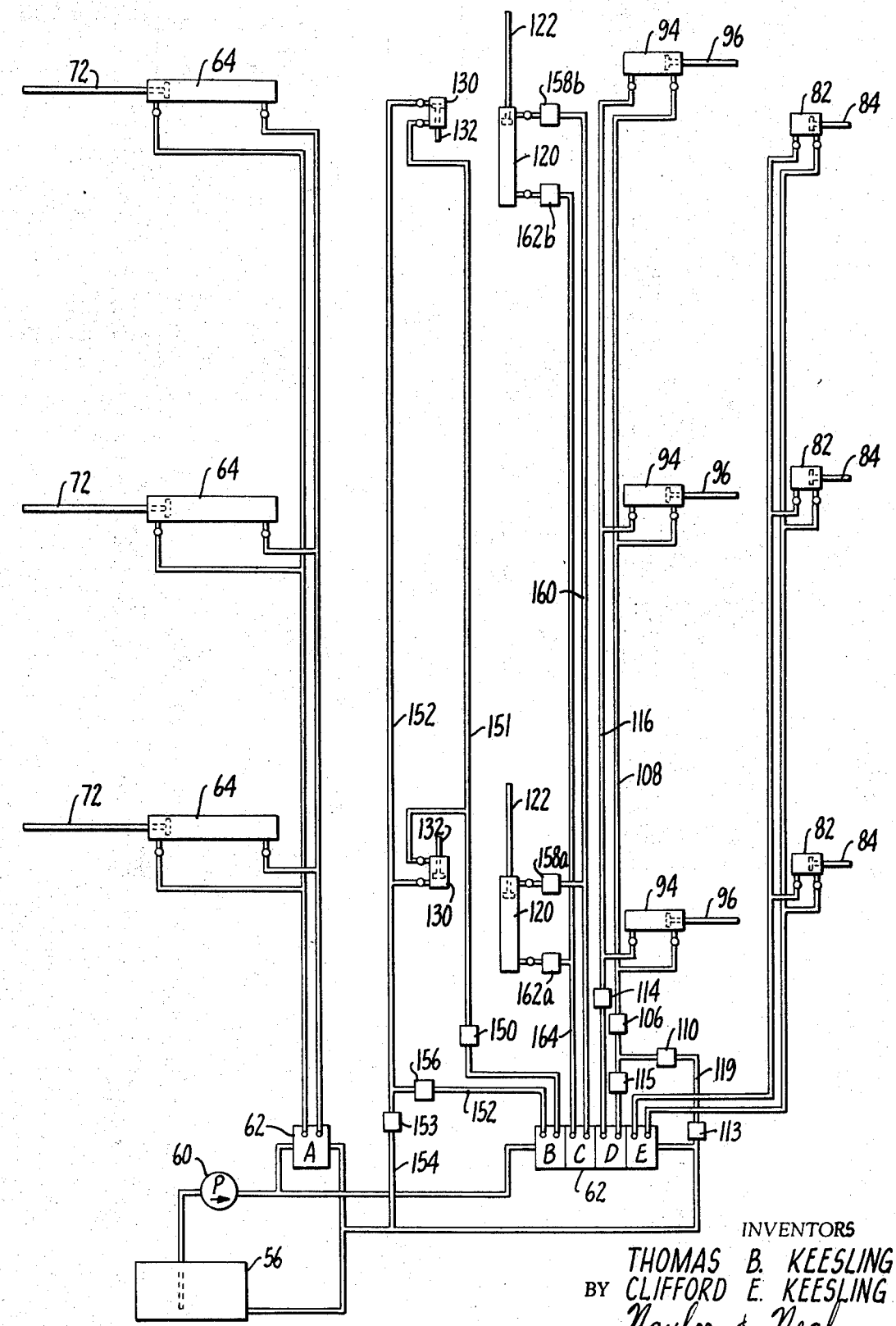
FIG. 28 is a schematic diagram of the hydraulic system.

The carpet cutting machine 10 includes a hydraulic system which performs many of the mechanical functions requiring a high work output. The overall hydraulic system is illustrated in the schematic of FIG. 28. The system is supplied from a hydraulic reservoir 56 located under the center of the machine near a central power housing 58, see FIG. 1, which contains all the mechanical and electrical power generating equipment. A hydraulic pump 60 located in the central power housing 58 serves five subsystem supplies 62a–62e as lettered in FIG. 28. Each of the subsystem supplies consists of a spring loaded solenoid operated valve which alternatively connects two output conduits to the pump and the reservoir.

Subsystem supply 62a operates three cradle cylinders 64 for raising and lowering the cradle 34. Returning to FIG. 2, the cradle arm 50 is shown in the raised position for supporting the supply roll 12 of carpet during the measuring and cutting operation. One end of the cradle cylinder 64 is attached to an extension plate 66 fixed on the side plates 24 for each of the two outer cradle cylinders 64, and on a bracket 70 fixed to the center cross-member 20 of the main frame 16 for the middle cradle cylinder 64 as shown in FIG. 11. The cylinder rods 72 of all three cradle cylinders 64 are pinned to short extension plates 76 mounted to a longitudinal cradle beam 74. This arrangement is clearly represented in FIGS. 2, 8, and 11. The cradle 34 with additional structural support from a secondary beam 78, can be lowered to a supply roll discharge position illustrated by the phantom lines in FIG. 2.

The gate bed 36 is raised into position or lowered to permit discharge of an order roll 40 by the gate cylinders 82 supplied by subsystem supply 62e. The two outer gate cylinders 82 are attached at one end to the same extension plates 66 that anchor the outer cradle cylinders 64. Similarly, the middle gate cylinder is pinned to a bracket 83, FIG. 11, fixed to the center cross-member 20 of the frame 16. The cylinder rods 84 of the gate cylinders 82 are pinned to a small plate 86 mounted to a longitudinal gate beam 88, as illustrated in FIGS. 2, 8 and 11. When the cylinder rods 84 are extended, the gate arms 46 further structurally reinforced by a secondary gate beam 90 pivot about the pivot shaft 48 to a closed gate position shown in FIG. 2. The pivot shaft is carried by support plates 92, FIG. 8, mounted on the longitudinal beam 22c of the main frame 16.

After the cutting and rolling of an order roll 40, the cylinder rod 84 can be retracted, lowering the gate arms 46 and hence the gate bed 36 to the position indicated by the phantom lines in FIG. 2. No longer restrained by the rollers 32 on the gate bed 36, the order roll 40 will then drop off the discharge bed 30 and onto collateral apparatus for distribution of the order roll 40.

Figures 9, 10:
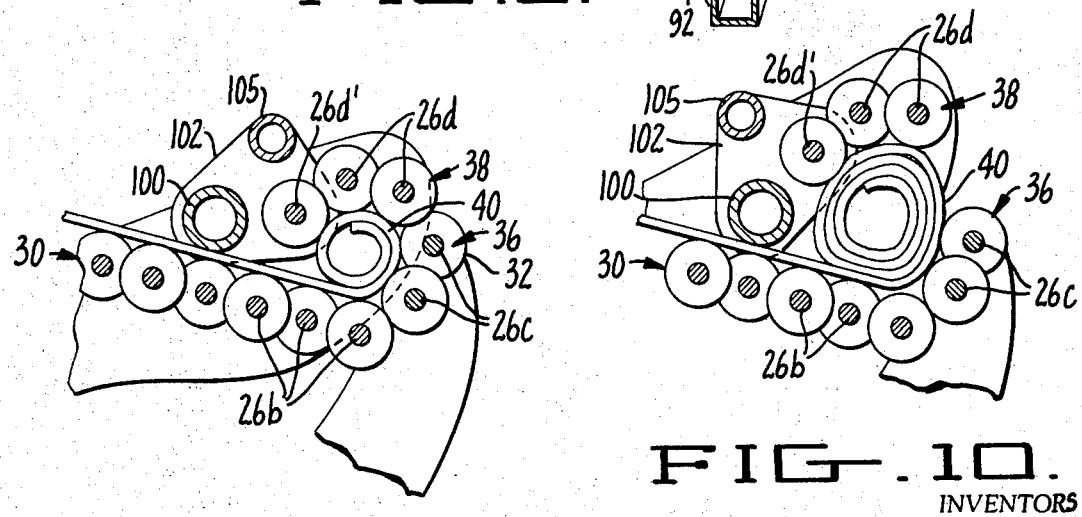
FIG. 9 is an enlarged side section of the roll forming apparatus taken on the line 9—9 in FIG. 1.
FIG. 10 is an enlarged side section of the roll forming apparatus of FIG. 9 in a more advanced stage of formation of a roll of carpet.

The operation of the roll form 38 is controlled by three roll form cylinders 94. The hydraulic subsystem supply 62d is closely tailored to the structural and operational design characteristics of the roll form. The roll form 38 performs two primary functions, flattening any carpet end-curl for accurate measurement, and directing the continuously fed carpet into a compact roll for distribution. The basic construction of the roll form 38 is most clearly illustrated in the exploded view of FIG. 8. As previously stated, three roller shafts 26d are fixed to the roll form arms 52, one of which is illustrated at the top of FIG. 8. When the cylinder rods 96 of the roll form cylinder 94 are fully retracted each roll form arm 52 will rest on a rubber cushion 98 mounted on the top of the longitudinal beam 22c of the frame 16 as shown in FIG. 2. In this position, the rollers 32 of the roll form 38 cooperate with the rollers 32 of the gate bed 36 and the rollers 32 of the discharge bed 30 to form a circular pocket as illustrated in FIG. 9. The end of the carpet 13 entering this pocket is forced to coil upon itself and to begin the formation of a roll. The last of the roller shafts 26d' on this continuous train of rollers provides a pivot shaft for a pressure roller 100. The pressure roller 100 is rotationally fixed to an end plate 102 which freely pivots about the roller shaft 26d'. A stop bracket (not shown) projecting from each of the side plates 52 provides a stop against the lower edge of the end plates 102 to stop the pressure roller 100 just short of actual contact with the rollers 32 on the discharge bed 30. Additionally, a torque bar 105 is so located on the end plates 102 that the combination weight of the torque bar 105 and pressure roller 100 will exert substantially a constant pressure on the underlying carpet 13 when rotation about the pivot axis of the roller shaft 26d' occurs. Thus, when the roll form 38 rises to accommodate an increasingly enlarging roll of carpet as illustrated in FIG. 10, the normal pressure force against the carpet 13 from the pressure roller 100 will remain essentially constant until the order roll 40 is of such size that the pressure of roller 100 is no longer necessary.

Returning to a consideration of the hydraulic schematic in FIG. 28 to control the lowering of the roll form a flow control valve 114 is included in the return line 116 for cylinder rod retraction. The flow control valve 114 permits the roll form 38 to be carefully lowered down to the discharge bed preventing possible damage to the rollers which might otherwise be occasioned by an uncontrolled lowering. After initial formation of a roll of carpet, the roll form 38 will freely rise as the size of the carpet increases. To fully control the pressure of the roll form on the roll 40, a system of three valves is used. A flow control valve 106 is included in the return line 108 for cylinder rod extension. This permits regulation of the rate of roll form rise. To regulate the force required to lift the roll form, a pressure relief valve 110 is included in a bypass line 119 to the hydraulic reservoir 56. To provide a further control to both rate of rise and force necessary to raise the roll form 38 an additional flow control valve 115 is included in the first part of the cylinder rod extension return line 108.

To assist in the raising of the roll form 38, if the dead weight of the roll form is found excessive in the proper formation of an order roll 40, booster springs (not shown) may be affixed to the roll form arm 52 and to the main frame 16 to lighten the effective weight of the roll form 38.

As illustrated in FIG. 8, the two outer roll form cylinders 94, pinned at one end to the main frame 16, have their cylinder rods 96 pinned to a lever extension 112 of the roll form arm 52. The center roll form cylinder 94 is pinned to an extension bracket (not shown) on longitudinal beam 22a (see FIG. 2). The cylinder rod 96 of the roll form cylinder 94 is pinned to a connecting beam 117, FIG. 8, attached to the lever extensions 112 of the roll form arms 52. When the roll form 38 is no longer needed to shape order roll 40 into a roll, the roll form 38 can be raised out of the way by extending the roll form cylinder rods 96 as illustrated by the phantom lines in FIG. 2. To override the previous controls mentioned to permit raising of the roll form as the roll size increases, a solenoid valve 113 is placed in the bypass line 119 blocking any fluid flow bypassed by the pressure relief valve 110. With the bypass line 119 blocked the roll form will rise independently of the formation of the order roll 40.

Figure 16:
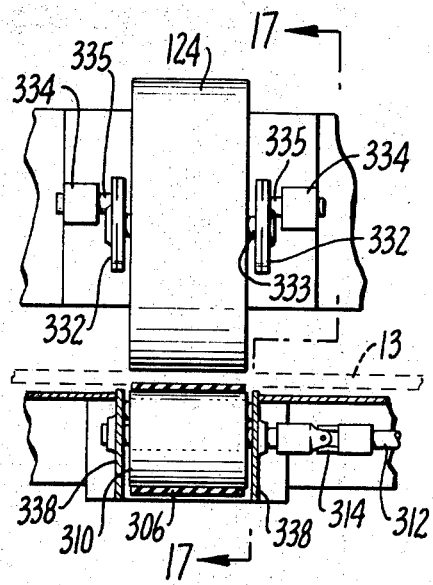
FIG. 16 is a partial vertical front section of the measuring apparatus taken on line 16—16 in FIG. 2.
Figure 17:
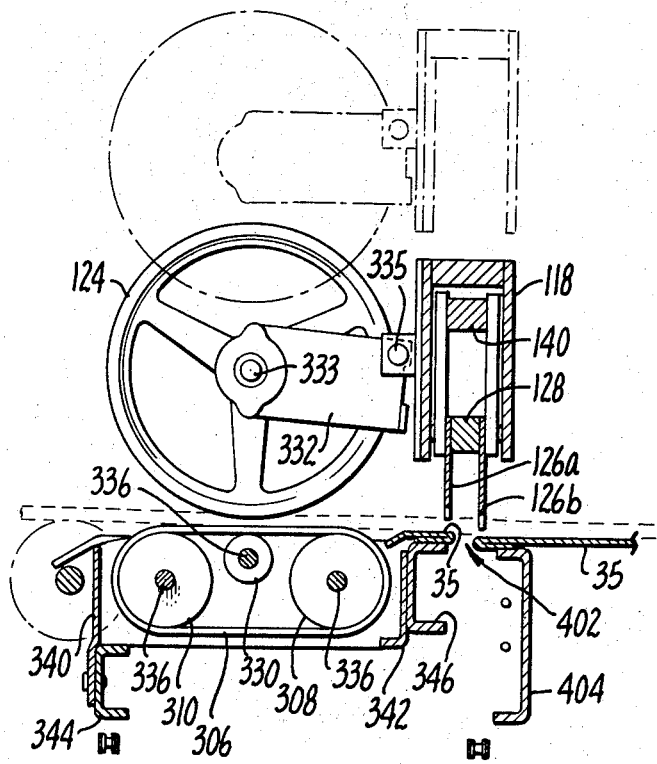
FIG. 17 is a vertical side section of FIG. 16 taken on the line 17—17 in FIG. 16.
Figure 18:
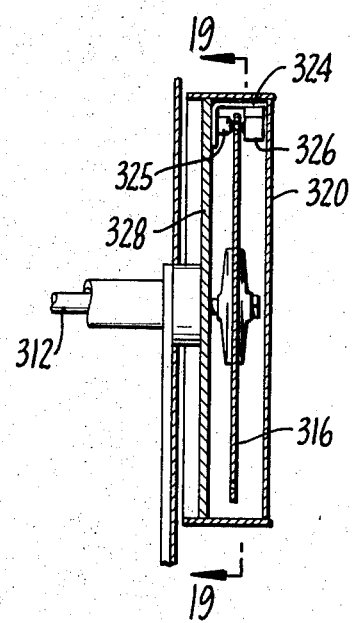
FIG. 18 is a vertical side section of the measuring pulse shutter taken on the line 18—18 in FIG. 3.
Figure 19:
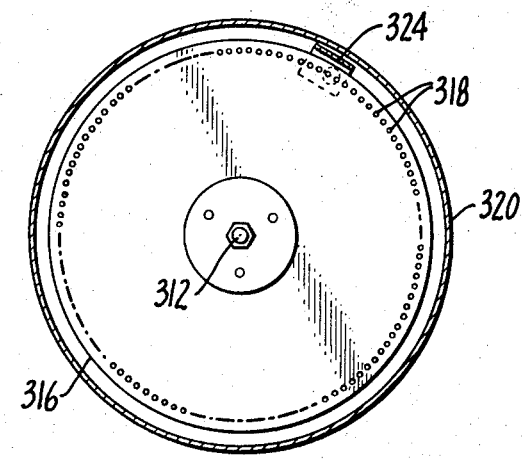
FIG. 19 is a vertical front section of FIG. 18 taken on the line 19—19 in FIG. 18.

The hydraulic system additionally operates a clamp beam 118, FIG. 1, that longitudinally extends across the carpet cutting machine 10 in a transverse direction to carpet travel. The cooperative operation of the clamp beam 118 with the carpet cutting operation will be considered in more detail hereafter. Presently, consideration is limited primarily to the hydraulic controls for the clamp beam 118. Two beam cylinders 120 are vertically mounted to the outer cross-members 20 of the main frame 16 as shown in FIG. 2 and FIG. 11. The cylinder rods 122 of the beam cylinders 120 are fixed to the ends of the clamp beam 118. During initial unroll of the supply roll 12 of the carpet, the clamp beam 118 is raised to a rest position with cylinder rods 122 extended as illustrated in FIG. 2. Before measurement of the length of carpet to be cut, the clamp beam 118 is lowered to a position above the carpet 13, as shown in FIG. 17 and FIG. 16 such that a weighted tracker wheel 124, FIG. 17, freely rolls on the underlying carpet. Once the desired length of carpet is measured, the carpet stops its forward movement and is clamped in place for cutting by two parallel combs 126a and b. The parallel combs 126a and b are separated by spacer bar 128. During measurement, these combs, 126a and b, were retracted into the clamp beam 118 by operation of two hydraulic comb cylinders 130 (FIG. 20).

FIG. 22 illustrates one end of the clamp beam 118. Essentially the components in either end are identical, and therefore, the description of the end shown in FIG. 22 is equally applicable to the opposite end.

The comb cylinder 130 is attached to the outer sides of the clamp beam 118. The cylinder rod 132 of the comb cylinder 130 is pinned to a vertical lever 134 that pivots about a pivot pin 136. Also attached to the lever by pin 138 is a comb bar 140. The comb bar 140 operates the raising and lowering of the parallel combs 126a and b through two identical pairs of linkage plates 142 which are pivotally fixed to the clamp beam 118 on pivots 149 (also shown in FIG. 21). The linkage plates 142 are pinned to both comb bar 140 and parallel combs 126a and b by pins 146 and 148. When the comb bar 140 is longitudinally moved by vertical lever 134, the combs 126a and b, will rotate about the axis of the pivots 144 and be raised and withdrawn into the clamp beam 118 as indicated by the phantom lines in FIG. 22. The linkage plates 142 are shaped such that rotation is limited when the top of the linkage plates strikes the top section 118' of the clamp beam 118, as illustrated by the phantom lines in FIG. 22.

Both comb cylinders 130 at each end of the clamp beam 118 operate simultaneously. In simultaneous retraction of both cylinder rods 132 there will necessarily be a small, diametrically directed, resultant component longitudinal movement caused by the rotational motion of the combs 126a and b about the pivots 144. Therefore, the combs 126a and b must be split in the middle as shown in phantom in FIG. 20, allowing each side to operate substantially independently. One set of parallel combs 126a and b will operate in the left half of clamp beam 118, and another set of identical parallel combs 126a and b will operate in the right half of clamp beam 118.

Considering the schematic of FIG. 28, the comb cylinders 130 are connected to subsystem supply 62b. To provide adequate control of the rate of extending the combs 126a and b, and the pressure exerted against a carpet a system of valves similar to that previously described for raising the roll form 38 is included in the comb extension sequence. A flow control valve 150 is included in the return line 151, to regulate the rate of extension of the combs 126a and b. For regulation of the pressure exerted by the combs 126a and b against a carpet, a pressure relief valve 153 is included in a bypass line 154 of the cylinder rod extension line 152. For an overall control of both pressure and rate of extension an additional flow control valve 156 is included in the cylinder rod extension line 152 prior to the pressure relief bypass line 154.

The two beam cylinders 120 are connected to the subsystem 62c, each having individual flow control valves 158a and b, included in the cylinder rod retraction line 160. Additionally, the beam cylinders 120 have individual flow control valves 162a and b included in the cylinder rod extension line 164 in close proximity to the beam cylinders 120 to insure that the operation of the beam cylinders 120 at each end of the clamp beam 118 is uniform. The valves, 158a and b, and 162a and b, permit the clamp beam to be raised and lowered at a steady and controlled rate.

MECHANICAL DRIVE SYSTEM

Figure 6:
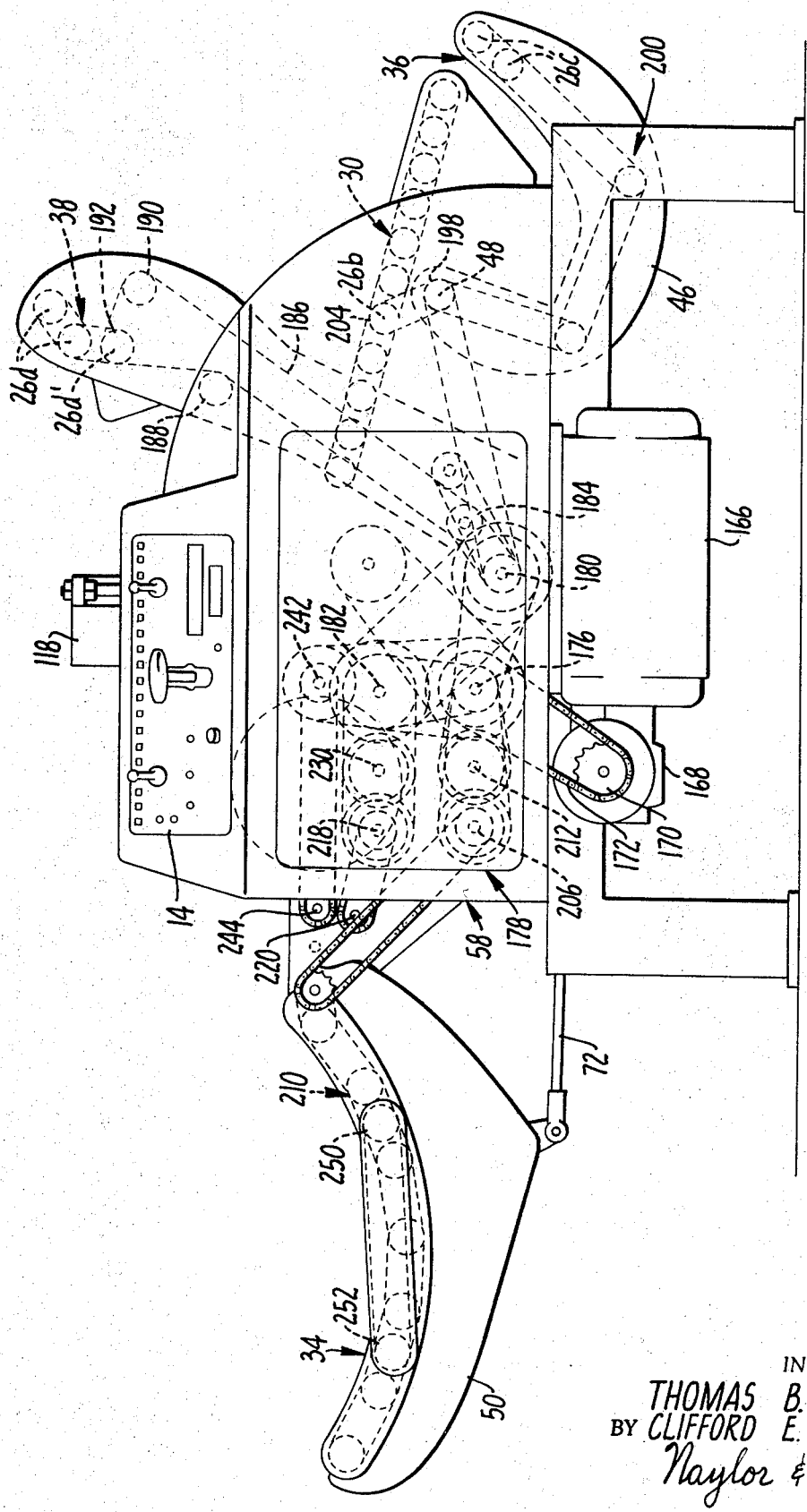
FIG. 6 is a side elevation of FIG. 1 schematically illustrating the transmission and chain drive to the beds of the cutting machine.

The carpet 13 is moved across the several beds on the carpet cutting machine 10 by mechanical power supplied by a primary drive motor 166 illustrated in FIG. 6. Through a system of sprockets and roller-type chain, mechanical drive is supplied to all the roller shafts 26 in the cutting machine.

Figure 27:
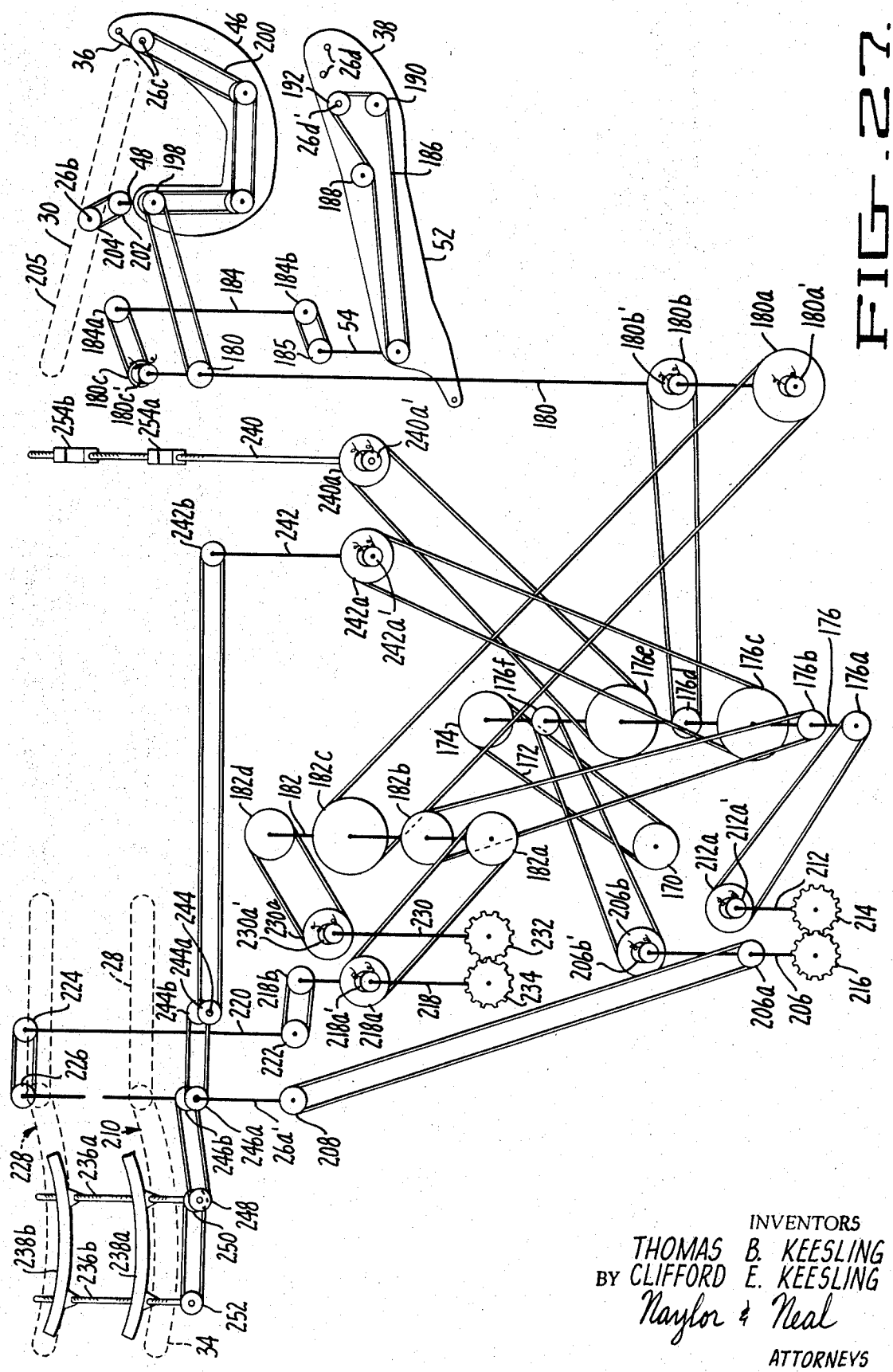
FIG. 27 is a schematic diagram of the transmission and chain drive system.

FIG. 6 is a view of the power control side of the cutting machine schematically illustrating the power train, and together with the schematic drawing in FIG. 27, will constitute the principal references considered in this section of specification.

The rotational output of the drive motor 166 is reduced by a worm gear reducer 168. An output sprocket 170 on the worm gear reducer 168 drives a double primary chain 172 which runs over a double drive sprocket 174 of a primary jackshaft 176 in the machine's transmission 178.

Theoretically, since the underside of the carpet is the only side in contact with the rollers 32 in all the beds, the peripheral speed of all the rollers 32 in the cutting machine should be equal. As the diameter of all rollers 32 is identical, the rotational drive to all of the roller shafts 26 is the same speed. However, for carpets and other sheet fabrics, there is a tendency for the sheeting when unrolled to slightly stretch or lengthen. To compensate for this inherent effect, a special differential drive has been included in the transmission 178 which will create approximately a 1.5% differential in speed between the beds on the lead side of the clamping beam 118, which include the cradle 34 and the lead bed 28, and the beds on the discharge side of the beam 118, which include the discharge bed 30, the gate bed 36 and the roll form 38. By an appropriate automatic selection of clutches, the carpet rollers 32 on the discharge side of the clamp beam 118 will progress at slightly increased speed when the carpet machine 10 is operating in the carpet forward direction, and at a slightly decreased speed when the carpet machine 10 is operating in the reversed direction.

A secondary jackshaft 180, FIG. 27, at the discharge end of the carpet cutting machine 10 drives at equal peripheral roller speed, the roll form 38, the gate bed 36 and the discharge bed 30. This secondary jackshaft 180 is either driven by a pinion sprocket 176d in connection with sprocket 180b which produces a rotational speed greater than the bed speed of the cradle 34 and lead bed 28, or by an alternate sprocket and chain train that produces a rotational speed less than that of the lead bed 28 and cradle 34. In this alternate sprocket and pulley train, pinion sprocket 176b drives sprocket 182b and hence a secondary jackshaft 182. A very slight reduction is created from a smaller sprocket 182c on secondary jackshaft 182 drive-connected to a slightly larger sprocket 180a on secondary jackshaft 180.

Figure 7:
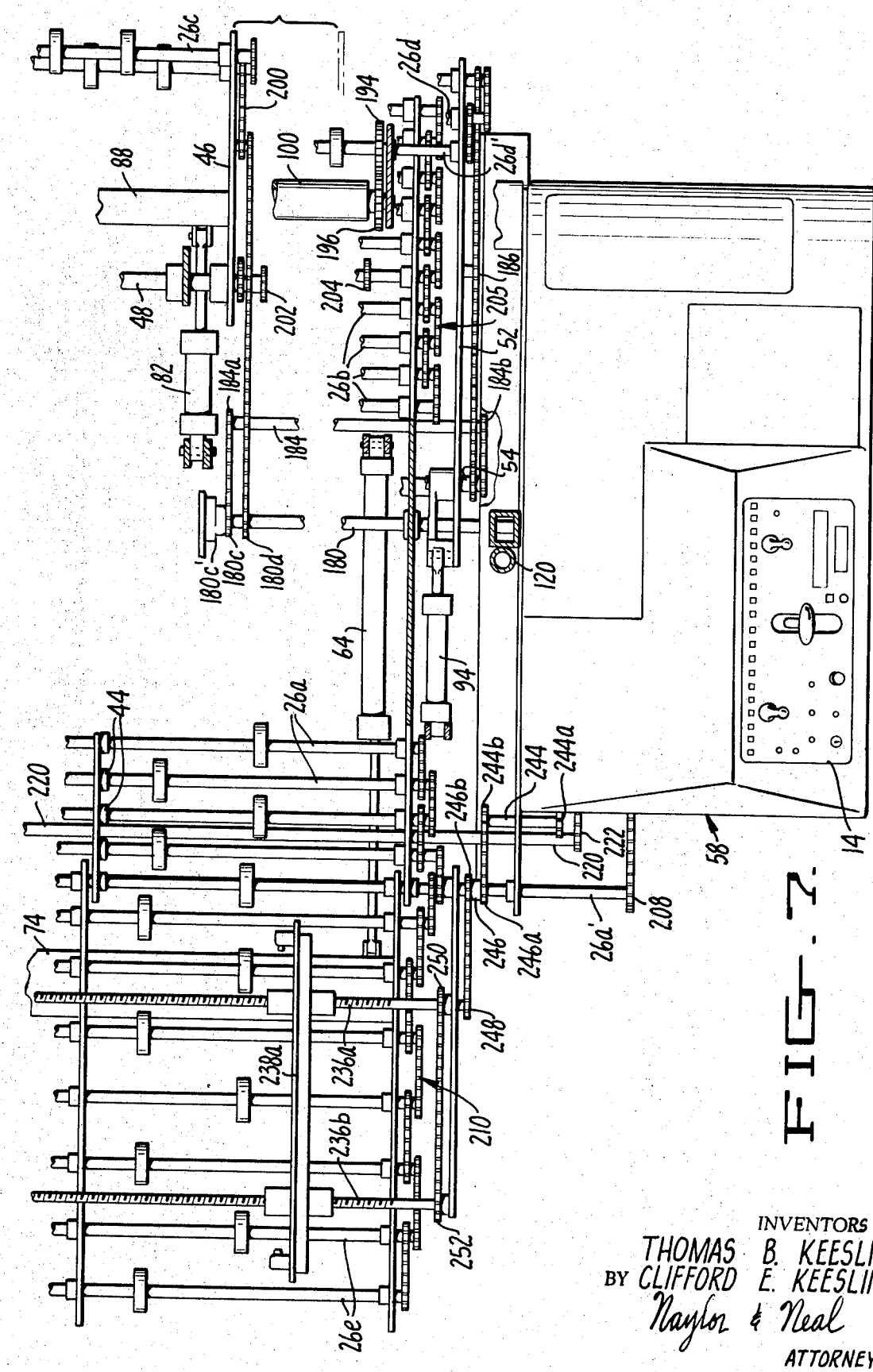
FIG. 7 is a fragmentary plan view of the operator's side of the cutting machine with chain guards removed to reveal the chain drive to the beds.

Both driven sprockets 180a and 180b are mounted to a secondary shaft 180 through clutches 180a' and 180b', FIG. 27, respectively. Selection of the desired differential can be made by engaging either one of the two clutches 180a' and 180b' and disengaging the other. Drive to the roll form 38 is developed through pinion sprocket 180c connected to the secondary jackshaft 180 through clutch 180c'. Sprocket 180c drives a short jackshaft 184 by chain connection to a sprocket 184a. From the short jackshaft 184 drive is finally delivered from sprocket 184b to a sprocket 185 fixed to the pivot axle 54, of the roll form arms 52, also as shown in FIG. 7. A drive chain 186, FIGS. 6, 7 and 27, passes under an idler sprocket 188 and around another idler sprocket 190, which conforms the drive chain 186 to the shape of the roll form arm 52, and finally around a fourth sprocket 192 connected to one of the roller shafts 26d' in the roll form 38. The two remaining roller shafts 26d, FIG. 27 in the roll form 38 are driven by the chain-connection as illustrated in FIGS. 6 and 7.

The pressure roller 100 is gear driven from a drive gear 194 fixed to roller shaft 26d' which directly drives a follower gear 196 fixed to the end of the pressure roller 100 as illustrated in FIG. 7.

The clutch 180c' enables the drive to the roll form 38 to be controlled independently to the drive of the discharge end gate beds. The purpose of independent drive is twofold. Firstly, after initial formation of an order roll 40, the drive in the roll form is not necessary for the continued formation of the roll. Since the differential speed in the discharge bed, gate bed, and roll form may in some instances exceed the natural stretch of a carpet 13 unrolled from a supply roll 12, it is desirable to permit some slippage of the order roll in the beds. With the roll form in place and directly driven in connection with the discharge bed and gate bed, excessive "grab" may be developed. To prevent this grab, as the order roll increases in size the clutch activation is decreased to eventually remove all drive power from the roll form. Secondly, when the roll form is raised during initial and end sequences in the cutting operation, there is, of course, no need for drive to the roll form. Therefore, during the sequences the roll form is raised, the clutch 180c' is customarily deactivated removing drive from the roll form.

Similarly, the rollers 32 in the gate bed 36 are operated from a pinion sprocket 180d mounted on the secondary jackshaft 180. The pinion sprocket 180d chain-drives an identically sized sprocket 198 mounted on the pivot shaft 48 which additionally constitutes the axis of pivot for the gate arms 46. Through a chain and sprocket train 200 the drive is delivered to roller shafts 26c of the gate bed 36.

The rollers 32 in the discharge bed 30 obtain drive from a drive sprocket 202 also fixed to pivot shaft 48 which is chain-connected to a sprocket 204 fixed to one of the roller shafts 26b in the discharge bed 30. For clarity the gate apparatus in FIG. 7 has been displaced as indicated by the bracket in the upper right corner of FIG. 7. The discharge bed roller shafts 26b are driven by a chain and sprocket train 205.

The cradle 34 and lead bed 28 are split into a left and right section, independently driven for purposes of aligning the supply roll 12 and partially unrolled carpet 13 as described in the specification hereafter. The section nearest the central power housing will be designated the right section or side.

Additionally, operation of the cutting process requires that the cradle 34 and lead bed 28 be directionally reversible independently of the normal forward direction of the primary jackshaft 176. The arrangement disclosed in FIG. 27 satisfies the forementioned system requirements. Forward drive to the right side is obtained from a pinion sprocket 176f fixed to the primary jackshaft 176 which drives an intermediate jackshaft 206. The driven sprocket 206b is connected to the intermediate jackshaft 206 through a clutch 206b; FIG. 27. The drive to the rollers 32 in the right side of the cradle 38 is obtained from a sprocket 206a chain-driving a follower sprocket 208 fixed to the roller shaft 26a' that also serves as the pivot axis for the cradle arms 50. The cradle roller shafts 26e and the roller shafts 26a in the lead bed 28 are driven by a chain and sprocket train 210 shown in FIG. 7.

For reverse drive to the right side of the cradle, drive from the main jackshaft 176 is transmitted by chain drive from pinion sprocket 176a to a follower sprocket 212a mounted to a short jackshaft 212 through clutch 212a'. This jackshaft 212 is mounted in the transmission 178 such that it is directly geared to the intermediate jackshaft 206. Gear 214, fixed to the short jackshaft 212 drives a gear 216 fixed to the intermediate jackshaft 206 and produces a change in rotational direction of shaft 206 over the prior instance of direct chain connection from the primary jackshaft 176. The drive apparatus to the cradle 34 and lead bed 28 from intermediate jackshaft 206 remains the same as that described for forward drive.

By proper selection of the clutch 212a' or 206b', the direction of cradle 34 and lead bed 28 movement for the right side may be determined.

The left side of the cradle 34 and forward bed 28 is similarly controlled. Drive, however, is obtained from the secondary jackshaft 182 rather than the primary jackshaft 176. Sprocket 182a on jackshaft 182 is chain-connected to sprocket 218a mounted to a short jackshaft 218 through a clutch 218a'. Drive is thereafter transmitted to a long drive shaft 220 by sprocket 218b fixed to the short jackshaft 218 and chain-connected to sprocket 222 fixed to the end of the drive shaft 220. On the left end of drive shaft 220 is fixed a sprocket 224 chain-driving a similar sprocket 226 fixed to roller shaft which for the left side is the diametric equivalent of shaft 26a' shown in FIG. 7. Drive is delivered to the remaining roller shafts 26a in the lead bed 28 and to the roller shafts 26e in the cradle 34 on the left side through a chain and sprocket train 228 similar to the train 210 illustrated for the right side in FIG. 7.

To obtain a reversal of direction, the drive from secondary jackshaft 182 is first transmitted to a short jackshaft 230 by the sprocket 182d on secondary jackshaft 182 and the chain driven sprocket 230a mounted to short jackshaft 230 through clutch 230a'. Jackshaft 230 is mounted in the transmission 178 adjacent to jackshaft 218 such that by gear 232 fixed on jackshaft 230 and cooperating gear 234 fixed on jackshaft 218, drive is delivered to jackshaft 218 in a direction opposite that first described. Further transmittal to the left side of the cradle 34 and forward bed 28 is accomplished in the same manner previously described. Again, by proper selection of the clutch, 230a' or 218a', the direction of cradle 34 and forward bed 28 movement for the left side may be determined.

In addition to powering the drive for the rollers 32 in the various beds, the primary drive motor 166 supplies the rotational drive to parallel lead screws 236a and b that control the movement of cradle guide shoes 238a and b used in the alignment operation, and to a forward sensor lead screw 240 also used in the alignment operation.

From the primary jackshaft 176, a comparatively large sprocket 176c chain drives a smaller follower sprocket 242a mounted through clutch 242a' to short jackshaft 242. The stepped-up rotational drive is transmitted from short jackshaft 242 to an intermediate shaft 244, also shown in FIG. 7, by the sprocket 242b in chain-connection with sprocket 244a. A sprocket 244b thereafter, transmits the drive to a similar sprocket 246a fixed on a short idler sleeve 246 that is free to rotate on roller shaft 26a'. Finally, the drive is chain-transmitted by sprocket 246b to a sprocket 248 fixed to the end of the lead screw 236a. A second sprocket 250 on jackscrew 236a operates the other lead screw 236b at the same rotational speed by a chain-connection to a similar sprocket 252 mounted at the end of the lead screw 236b.

The drive to the forward sensor lead screw 240 is more direct. Again a comparatively large sprocket 176e fixed to the primary jackshaft 176 chain-drives a smaller follower sprocket 240a mounted to the end of the sensor lead screw 240 through clutch 240a'.

Throughout most of the cutting operations, the drive in the primary jackshaft 176 is in a forward or clockwise direction. However, to return the cradle shoes 238a and b and intermediate sensors 254a and b to their initial positions, at the outer edges of the beds, the primary jackshaft 176 is operated in reverse. All of the clutches herebefore described are electronically operated. Although only nine clutches are included in the system, all the automatic operations can be performed by electronic selection of the proper pattern of clutch engagements and direction of motor drive for the particular cutting sequence in process.

ROLL CENTERING AND CARPET ALIGNMENT

When a supply roll 12 is placed upon the cradle 34 as shown in FIG. 1, it must be properly aligned to insure that the unrolled carpet 13 will be cut squarely. Conventional alignment of one edge against a straight edge has proved unsatisfactory for supply rolls that are irregularly rolled and may result in inaccurate measuring and cutting. To prevent drift away from a straight edge guide, the discolsed invention seats the supply roll 12 between two cradle guide shoes 238a, and b with sufficient tolerance to provide a corrective alignment after a partial unrolling of the carpet, and the carpet is measured at its center.

The system is designed to accept all sized rolls of carpet up to the present standard maximum width of fifteen feet.

Figure 12:
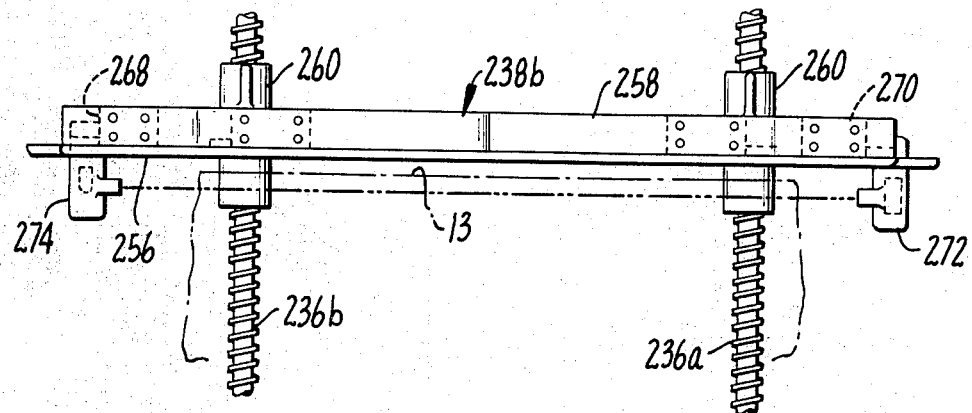
FIG. 12 is a partial plan view of a guide shoe and an optical sensor taken on the line 12—12 in FIG. 2.
Figure 13:
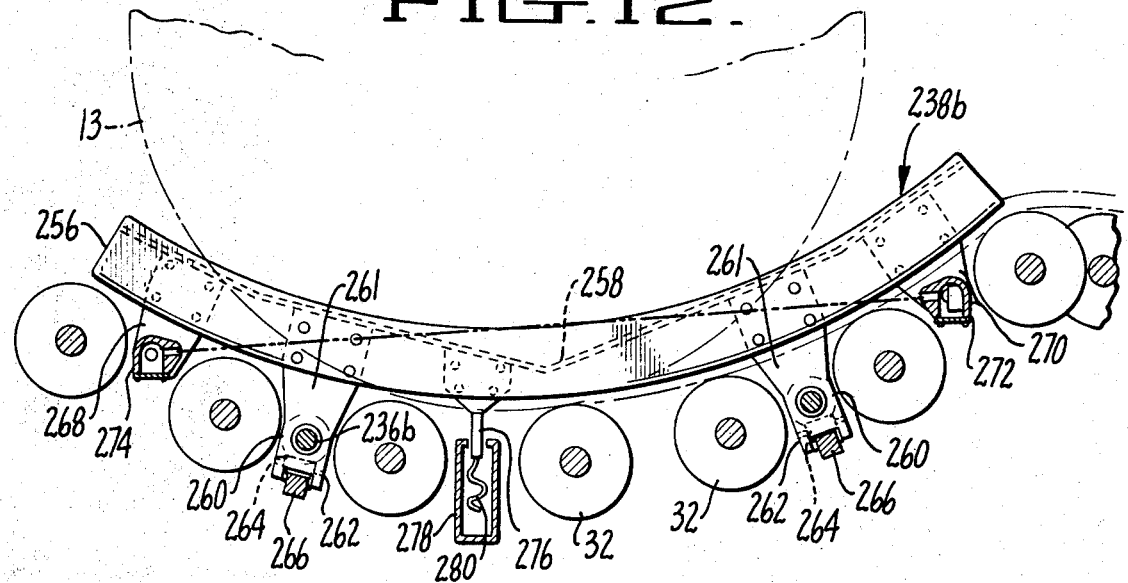
FIG. 13 is an enlarged fragmentary view of the cradle of FIG. 2 with the optical sensor additionally shown in section.

The construction of the guide shoes 238a and b is exemplified in detail in FIGS. 12 and 13. The guide shoe 238b, therein represented, operates on the left side of the cradle 34. As the guide shoe 238a on the right side is the reverse equivalent of the left guide shoe, numerical designations of the structural elements will be the same for both shoes. The guide shoe 238b has a smooth faceplate 256 fixed to a perpendicularly mounted shoe rib 258. Two threaded guide sleeves 260 are mounted to both the faceplace 256 and the shoe rib 258 by brackets 261. The two guide sleeves 260 are spatially parallel and threaded on lead screws 236a and b.

The lead screws 236a and b, on which both guide shoes 238a and b are mounted, run the full width of the cutting machine. However, the threading on the part of the lead screws on the right side of the cradle is the reverse of that on the left side. This permits the two guide shoes 238a and b to simultaneously move in opposite directions, either converging or diverging when the lead screws are rotated.

Extending from each of the guide sleeves 260 is a guide housing 262 carrying a plastic guide block 264 that rides along a tracking beam 266 secured to the cradle structure (see FIG. 2). This tracking apparatus relieves the weight of the guide shoe from the lead screws 236a and b and provides a stabilizer guide for the longitudinal movement of the guide shoe 238b down the lead screws 236a and b.

A bracket, 268 and 270, is attached to each end of the faceplate 256 and the shoe rib 258. On one bracket is fixed a lamp 272 directing a beam of light to a light sensor 274. As illustrated in FIG. 12, by a phantom line, the beam is directed a short distance in front of the smooth faceplate 256. FIG. 13 illustrates that the beam cuts across the arcuate cradle 34 and will be interrupted by a roll of carpet placed in the cradle 34 adjacent to the smooth faceplate 256. Together, the sensor components, 272 and 274, comprise an optical sensor that is activated when the beam detects the presence of an object interrupting its path. Power and signal lines 280 are supplied to the lamp 272 and sensor 274 through tube 276 which extends below the guide shoe 238b and into a slotted supply trough 278. Two supply troughs 278 are mounted on the cradle structure (see FIG. 2) and run substantially the full width of each half of the cutting machine. The trough 278 contains coiled power and signal lines 280 supplying the moving guide shoe 238b.

Corrective alignment to the supply roll as the carpet is unrolled is further provided by two forward optical sensors 254a and b. As illustrated in FIG. 3, the forward sensors 254a and b are threaded to a forward sensor lead screw 240 similar to the lead screws 256a and b for guide shoe control. The forward sensor lead screw 240 is mounted just to the discharge side of the clamp beam 118 as illustrated in FIG. 3.

Figure 14:
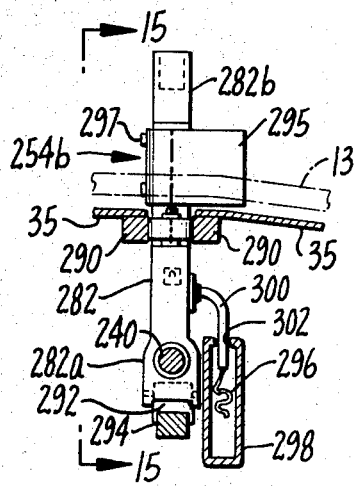
FIG. 14 is an enlarged vertical section of the forward sensor apparatus taken on the line 14—14 in FIG. 3.
Figure 15:
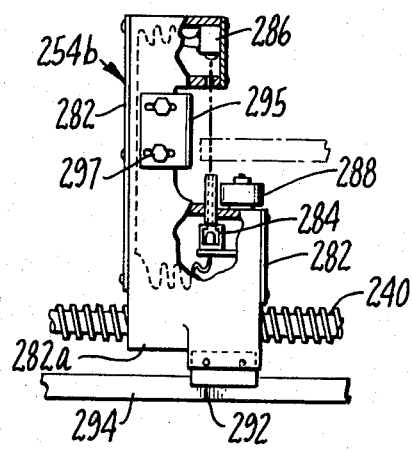
FIG. 15 is a side elevational view of the forward sensor apparatus of FIG. 14 taken from the plane cut by line 15—15 in FIG. 14.

The elements constituting a forward sensor 254 are represented in FIGS. 14 and 15 illustrating the left forward sensor 254b which is structurally characteristic of both sensors. A sensor housing 282 contains a sensor lamp 284 which directs a beam of light, represented by a phantom line in FIGS. 14 and 15, to a light detector 286 mounted vertically above. Movement of the forward sensor 254b is controlled by rotation of the lead screw 240 which is threaded through the lower part of the sensor housing 282a. Vertical alignment of the sensor 254b is maintained by tracking a roller 288 between two rails 290 fixed to the edges of the gap created in the plate bed 35 through which the upper part of the sensor housing 282b and the sensor 286 protrude. Vertical support of the sensor 254b is provided by the plastic guide block 292 mounted in the lower part of the sensor housing 282a. The guide block 292 rides on a rail 294 which runs the same width as the trough 278 (FIG. 2). An adjustable carpet guide plate 295 is secured to the upper sensor housing by two bolts 297. Power is supplied to the sensor lamp 284 and control signals are transmitted from the light receiver sensor 286 through a power and signal line 296 coiled in a supply trough 298 through a tube 300 which is connected to the sensor housing 282 and is extended down into the trough 298 through a gap 302 that runs the length of the trough 298. The supply trough 298 is fixed to the side plates 42a and b of the main frame 16 and extends through the width of troughs 278.

ALIGNMENT OPERATION

After placement of the supply roll 12 on the cradle 34 the two guide shoes 238a and b, FIG. 3, converge from their initial at rest position at the outer edges of the cradle and move toward the cradle center.

Simultaneously to the convergence of the guide shoes 238a and b, the supply roll 12 is rotated by the rollers 32 in the cradle 34. To prevent the supply roll 12 from unrolling during the alignment sequence, the rollers 32 in the cradle 34 are driven in the reverse direction as indicated by arrow A in FIG. 4I.

Figure 4:
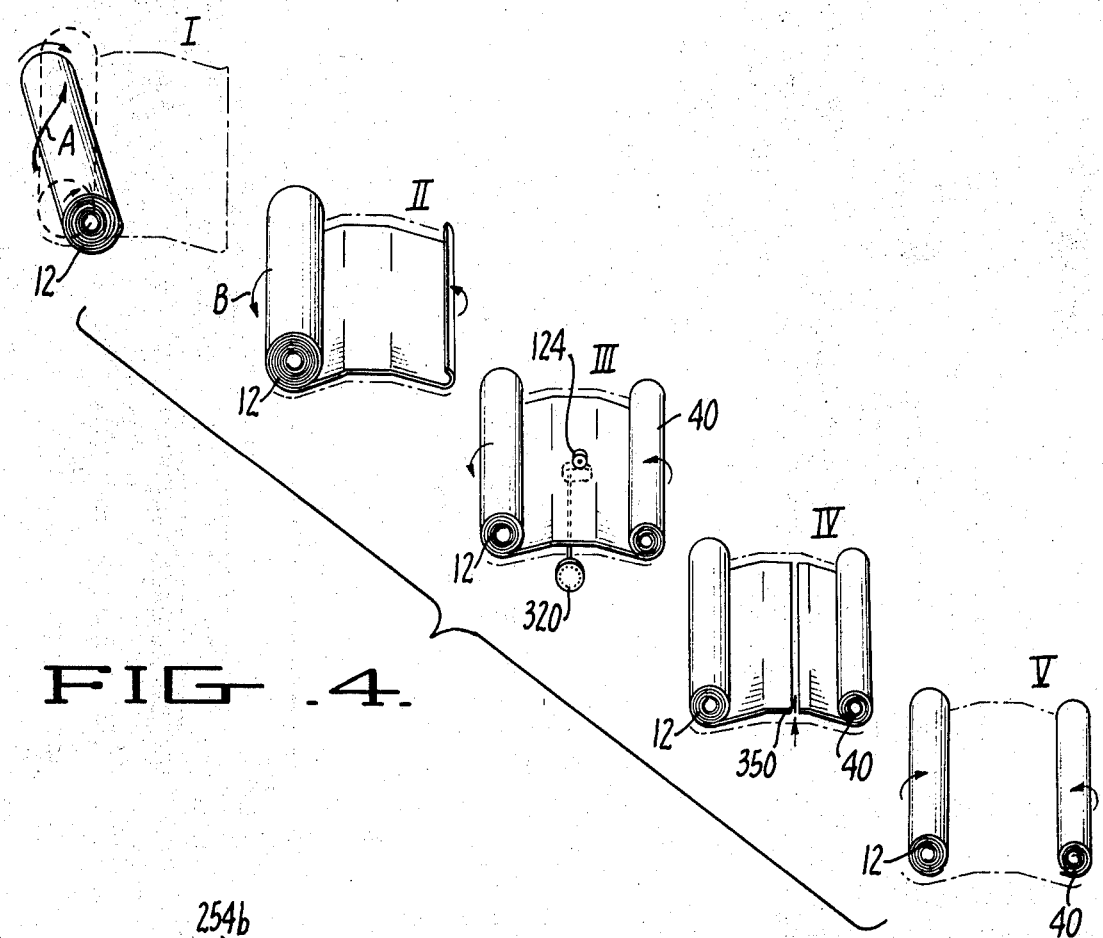
FIG. 4 is a process schematic of the principal sequences in a complete cutting cycle.
Figure 5:
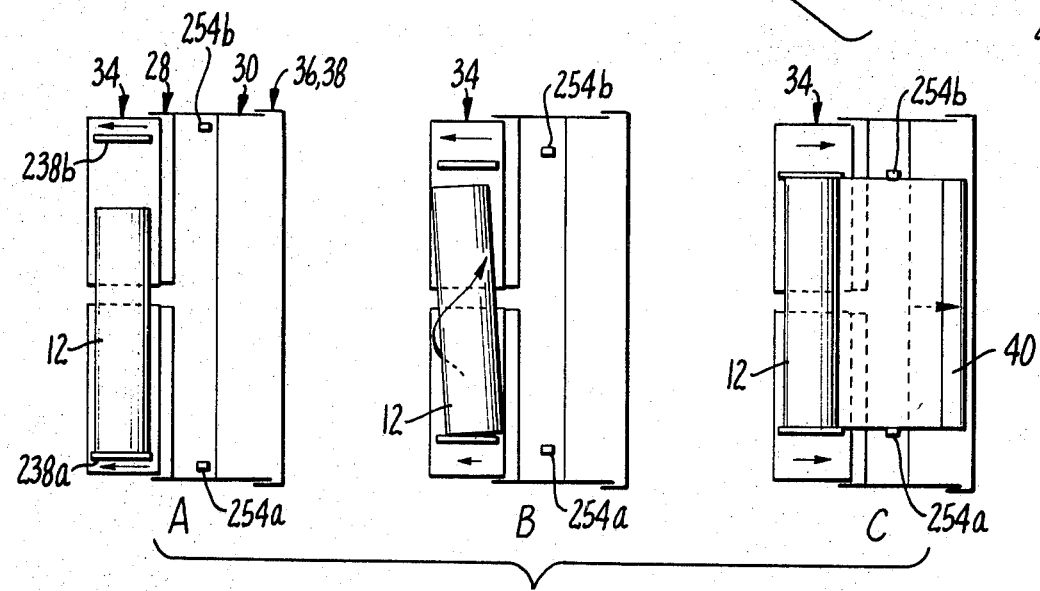
FIG. 5 is a sequence schematic of the method of centering the carpet on the cutting machine.

Turning now to the sequential diagrams in FIGS. 4 and 5, both the left and right sides of the cradle 34 continue to operate at equal rotational speeds until the optical sensor 274 on one of the converging guide shoes 238a or b indicates the presence of the supply roll 12 next to the face plate 256. Considering FIG. 5A, on detection of the supply roll 12, a signal from the sensor 274 on guide shoe 238a partially disengages the electrically operated clutch (for our example clutch 212a' shown in FIG. 27 only) driving the right side of the cradle 34 and lead bed 28. Where desirable, the partial clutch disengagement may be accompanied by application of a brake. The partially disengaged clutch coupled with a braking action (not shown) imposed on the jackshaft driving the right side of the cradle create a reduction in rotational speed on this side. This differential in roller speed causes the supply roll to skew as illustrated in FIG. 5B. When this occurs, the supply roll rotation becomes relatively helical causing a lateral displacement of the roll 12. Where sufficient skew is not caused by differential drive, physical engagement between the roll and the faceplate 256 of the shoe effect the necessary skew. The differential roller drive and guide shoe convergence continue until the light receiver sensor 274 on the opposite guide shoe 238b indicates the presence of the other end of the supply roll 12. On detection of the roll, the drive to both sides of the cradle equalizes and the guide shoe convergence stops as the supply roll 12 is now properly centered in the cradle 34. The direction of the cradle drive is then changed from reverse to forward as indicated by arrow B in FIG. 4II and the carpet begins to unroll.

During convergence of the guide shoes 238a and b, two forward sensors 254a and b concurrently converge. The forward sensors 254a and b, however, have a distance lag behind the convergent guide shoes. Once the carpet is aligned in the cradle the movement of the forward sensors 254a and b temporarily ceases. The convergent movement is not reactivated until the lead edge of the carpet being unrolled trips an override trigger switch 304, approximately located midway between the forward sensors 254a and b, as shown in FIG. 3. The sensors then continue to converge until at least one of the sensors detects the presence of the carpet edge. If only one sensor detects the edge of the carpet a secondary alignment sequence is initiated. The sequence is nearly identical to that performed for cradle alignment except the drive clutch on the opposite side is deactivated since the carpet is now moving in the forward direction. For example, if forward sensor 254a were the first to detect the presence of the carpet, the clutch driving the left side of the cradle 34 and the lead bed 28 (in our example clutch 218a' in FIG. 27) would be partially deactivated allowing the right side to maintain a greater driving speed than the left. The corrective alignment differential in the cradle 34 and lead bed 28 continues until both sensors indicate the presence of the carpet edge whereon normal forward drive is reinstated as illustrated in FIG. 5C. The carpet, centered both in the cradle 34 and at the plate bed 35, is now properly positioned to be cut squarely in the cutting sequence.

MEASURER

Measurement of the length of carpet 13 to be cut is accomplished by apparatus which compositely is designated a measurer. The essential components to the assembly are illustrated in FIGS. 16 through 19. First, considering FIG. 17, the most basic form of the measurer comprises a broad, thin belt 306 that rides over a forward drum 308 and a drive drum 310. Friction of the carpet 13 against the belt drives the drums, 308 and 310. The drive drum 310 is connected to a drive shaft 312 by a universal joint 314 shown in FIG. 16. The drive shaft 312 transmits the rotational output to a shutter wheel 316 illustrated in FIGS. 18 and 19.

The shutter wheel 316 is perforated around its periphery with equidistant holes 318. Knowing the effective diameter of the drive drum 310 with overriding belt 306, each of the holes 318 will correspond to an increment of carpet movement. By judicial selection of drive drum diameter and the number of holes 318 around the shutter wheel 316 each hole in the disclosed embodiment is made to represent one-tenth of an inch of carpet travel. The shutter wheel is enclosed in a protective casing 320, FIGS. 18 and 19 (also shown by broken lines in FIG. 3) which is mounted against end frame rib 322 (FIG. 3). Fixed on one arm of an L-bracket 324 is a sensor lamp 325 directing a beam of light at a radius from the center of the shutter wheel 316 that intersects the centers of all the perforations. When a hole is in line with the beam, the beam passes through the hole and impinges on a light receiver sensor 326 mounted to the other arm of the L-bracket 324 which is fixed to a back face 328 of the protective casing 320. As the shutter wheel 316 is rotated, the receiver sensor 326 emits a pulsating signal representative of carpet travel which at an appropriate time may be shunted to an adder circuit for recording the distance traveled.

Since the drive drum 310 rotates the shutter wheel 316, the friction developed by the weight of the carpet alone on the belt 306 is insufficient to prevent slippage occasioned by the inertial effects of the system. Therefore, a weighted tracking wheel 124 is included to press the carpet 13 firmly against the belt 306. To prevent sagging of the belt 306, an idler roller 330 is placed between the drums 310 and 308 below the point of contact of the tracking wheel 124, as shown in FIG. 17. The tracking wheel 124 is supported by an arm 332 comprised of two parallel rectangular plates with a connecting axle 333 for the tracking wheel. The arm 332 is connected to the clamp beam 118 by two pins 335 protruding from two bosses 34 fixed to the clamp beam 118. The arm 332 is so constructed that when the clamp beam 118 is in a raised position, the arm 332 extends perpendicular to the beam supported by the pins 333 and the brace action of the lower corner of the arm 332 against the clamp beam 118, as illustrated by the phantom lines in FIG. 17. However, when the beam 118 is lowered, the contact of the tracking wheel 124 with the underlying carpet 13 slightly raises the tracking wheel 124 relative to the clamping beam causing removal of the brace action of the arm 332. In this state the full weight of the wheel 124 and much of the weight of the arm 332 is directed against the carpet 13 causing substantial increase in the effectiveness of the frictional contact between carpet 13 and belt 306.

To further insure against slippage, a small shaded pole electrical motor (not shown) may be provided to drive the drums 308 and 310 with sufficient power to overcome the inertial effects and frictional losses in the system but with insufficient power to drive the system independent of the movement of the carpet.

The drums 308 and 310, and idler roller 330, are mounted on individual axles 336, FIG. 17 between two parallel bearing plates 338. The bearing plates are connected by end plates 340 and 342. The open box formed by these four plates is located in a slot at the center of the plate bed 35. The end plate 340 is attached to a tracking rail 344 which forms an element of the cutting assembly hereafter considered. The opposite end plate 342 is fixed to a second tracking rail 346 of the cutting assembly. It must be noted that during operation of the measurer, the combs 126a and 126b are retracted into the clamp beam 118 and are not in the extended clamping position illustrated in FIG. 17.

MEASURING OPERATION

Turning to FIG. 3, a brief consideration of the measurer operation may be made. When the lead edge of the carpet trips trigger switch 304, in addition to the activation of the forward sensor lead screw 240, the hydraulic subsystem supply 62c (see FIG. 28) is reversed causing retraction of the cylinder rods 122 of the beam cylinders 120 and lowering of the beam 118 such that the tracking wheel 124 contacts the underlying carpet 13. The rotation of the belt 306 and drums 108 and 110, is transmitted to the shuttter wheel 316 by drive shaft 312, FIG. 20 (also illustrated by broken lines in FIG. 3). The light receiver sensor 326 and sensor lamp 325 may also be activated by trigger switch 304. Recording of measurement is not begun until the lead edge of the carpet trips a limit trigger 348. The trigger switch 348 (FIG. 3) is located near the discharge end of the machine adjacent to the pressure roller. When the carpet is first advanced to the discharge end of the machine the carpet trips the trigger switch 348 to cause the pressure roller to be lowered onto the carpet, flattening out any curve on the end of the carpet. The rollers are then reversed for a short distance to retract the end of the carpet from the trigger switch 348 thereby giving an accurate measure of the length of flattened carpet between the trigger swich and the cutting means, and the adder associated with the measurer is pre-set to this accurate measurement when the trigger switch 348 is uncovered. Additionally, when the trigger switch 348 is uncovered, the carpet drive rollers are restarted in the forward direction, and the electrical output pulses developed by the sensor receiver 326 are shunted to the adder circuit in control panel 14, FIG. 1, to accumulate the length of carpet measured out beyond the cutting means. Once the measured length desired is obtained, drive to all beds ceases and the cutting operation is initiated.

In certain situations it is desirable to employ two trigger switches in place of the single trigger switch 348, one trigger stopping advance of the carpet and lowering the roll form and the second trigger sensing the edge of the flattened carpet after the carpet is backed up under the pressure roll. In situations of this type, the one trigger may be mounted between the top two roller shafts 26c (FIG. 10) and the second trigger may be mounted under the conveyor rollers 26b just to the discharge side of the pressure roller 100 with both triggers made from photocells which during the respective periods when they are used are illuminated by a single light source mounted on the support tube 26d' of the roll form. Whether two or one trigger is used for switch 348, a limit switch is closed by the roll form when it reaches its lower position to start reversal of carpet direction.

CUTTING APPARATUS

Essentially the cutting of the aligned carpet 13 is accomplished by a reciprocating, double-edge knife blade 350 (FIGS. 20 through 25) mounted on a cutter carriage 352 that traverses the width of the cutting machine 10. The cutter carriage 352 is operated in close coordination with the clamp beam 118. This operation will be considered after a preliminary description of the elements comprising the cutter apparatus.

Figure 23:
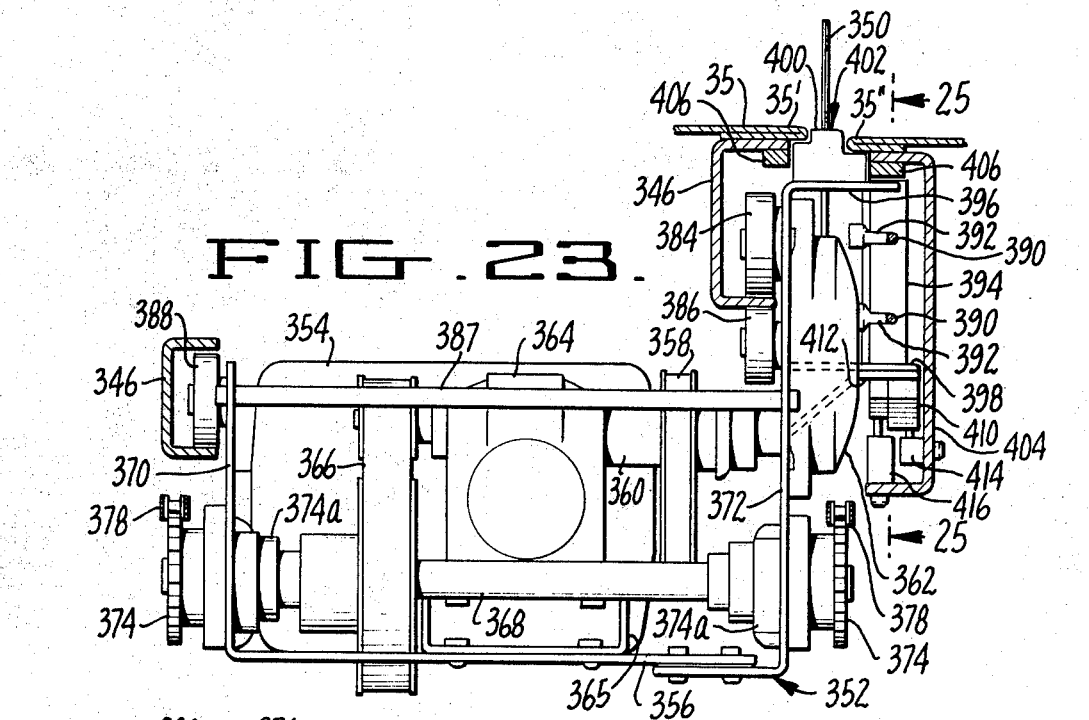
FIG. 23 is a vertical side section taken along the line 23—23 in FIG. 20 showing an end elevational view of the cutting apparatus.
Figure 24:
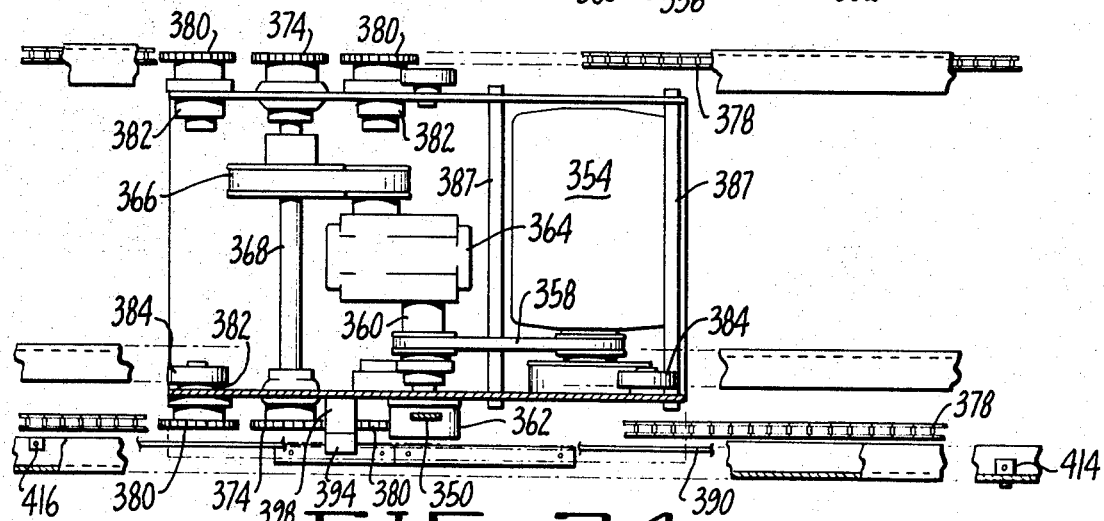
FIG. 24 is a plan view of FIG. 23.
Figure 25:
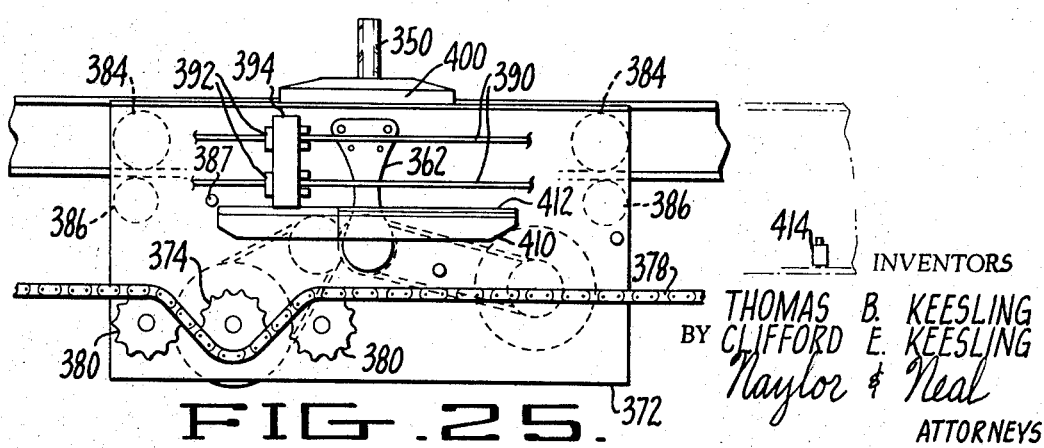
FIG. 25 is a vertical side section of FIG. 23 taken along the line 25—25 in FIG. 23.

The cutter carriage 352 shown in FIGS. 23 and 24, has a self-contained drive for both reciprocating the knife blade 350 and moving the cutter carriage 352 across the cutting machine 10. The drive is supplied by an electric motor 354 mounted to the bottom plate 356 of the cutter carriage 352. The output of the electric motor 354 is connected by a pulley belt 358 to a drive shaft 360 which at one end is coupled to an enclosed motion translater 362 that develops the reciprocating action of the knife blade 350 and which at the other end is connected to a drive reduction box 364 mounted on bracket 365. The output of the reduction box 364 is connected by a belt 366 to a carriage drive shaft 368 which is mounted at each end through the side plates 370 and 372, on identical bearings 374a. Fixed on each end of the carriage drive shaft 368 that protrudes through the side plates 370 and 372 is a drive sprocket 374. The teeth 376 on the drive sprockets 374 engage two parallel tracking chains 378 in the manner illustrated in FIG. 25. To maintain engagement of the drive sprockets 374 with the tracking chains 378, two idler sprockets 380 are mounted on bearings 382 at each side of both drive sprockets. As shown in FIGS. 24 and 25, the tracking chain 378 rides over the idler sprockets 380 and under the drive sprocket 374 for positive engagement.

The tracking chain 378 runs the entire width of the cutting machine and is attached at each end to a plate mount 382 fixed to the main frame 16 as illustrated in FIG. 20.

The weight of the cutter carriage 352 is supported by rollers. The side of the cutter carriage 352 on which the reciprocal knife blade 350 is mounted is supported by a set of two rollers 384 and 386 rotationally fixed near each end of the side plate 372 as shown in FIG. 25. The larger roller 384 rides on a tracking rail 346 that is attached under the plate bed 35 as shown in FIG. 23. The smaller roller 386 rides essentially directly below the larger roller 384, on the under side of the tracking rail 346 and prevents any vertical carriage movement that might otherwise be developed by the downward stroke of the knife blade 350 when cutting carpet. Internal structural movement of the carriage is materially lessened by three support rods 387, FIG. 24 extending between the side plates 370 and 372. The opposite side of the cutter carriage 352 is supported by a single roller 388 riding on a tracking rail 346.

Power is supplied to the electric motor 354 by two trolley wires 390 running the width of the cutting machine 10 parallel to the tracking chains 378 and fixed to the plate mounts 382 as shown in FIG. 20. The electrical current is picked up by two brushes 392, each impinging against one of the trolley wires 390 as they run through a guide block 394, FIG. 23. The guide block 394 is mounted to both the side plate 372 and a perpendicular extension 396 of the side plate.

The double-edge knife blade 350 extends through a guide block 400 that is mounted on the perpendicular extension 396 to the side plate 372 as shown in FIG. 23. The guide block 400, in addition to providing a guideslot for the saw blade, provides the necessary lateral alignment of the cutter carriage 352. The wide portion of the guide block travels between the top edges of a longitudinal beam forming the tracking rail 346 and a second longitudinal beam 404 shielding the trolley wires 390. Fixed to each of these edges to increase the width of the guide surface is a bearing rail 406, FIG. 23.

The cross-section view in FIG. 23 illustrates that the lead edge 35' at the cutting slot 402 in the plate bed 35 is slightly higher than the aft edge 35''. The guide block 400 is shaped to extend up through the cutting slot 402 to the height of the lead edge 35'. The combs 126a and b in the clamp beam 118 conform to this height differential such that comb 126b is slightly greater in height than comb 126a as illustrated in FIGS. 17 and 22. When the combs are depressed to clamp the carpet against the plate bed 35 as shown in FIG. 17, the height differential will create an initial tautness of the carpet over the cutting slot 402. As the guide block 400 passes across the cutting slot 402, the carpet is additionally stretched where raised by the guide block 400 permitting a clean cut by the knife blade 350.

CUTTING OPERATION

As previously stated, once the measured length of carpet desired is obtained, drive to all beds ceases and the cutting operation is initiated. First the cylinder rods 132 for the comb cylinders 130 (see FIG. 22) are extended lowering the combs 126a and 126b to their clamping position. Extending the cylinder rods 132, FIG. 22, initiates the movement of the cutter carriage 352 across the cutting machine 10, FIG. 20. When the cutter carriage 352 reaches the opposite side, a double cam block 410 mounted to an extension bracket 412 on the cutter carriage 352, depresses one of a pair of limit switches, 414 and 416, which are attached at the opposite ends of the longitudinal beam 404. Each of the limit switches stops operation of the cutter and conditions the machine to start operation of the cutter in the other direction for the next cut. As the knife blade 350 is double edged, the cutter carriage 352 will move across the cutting machine 10 in one direction for one cut and move in the opposite direction for a subsequent cut.

OPERATION

Although the operation of each of the principal subsequences has been described, the cutting operation as a whole will here be considered. Reference will particularly be made to FIGS. 4, 26 and 29.

FIG. 29 is a graphic illustration of the sequential effect of a complete cutting cycle on certain principal elements in the cutting machine. The roman numerals at the top of the illustration key the principal sequences of the cutting operation to the pictorial sequences shown in FIG. 4. The control panel 14 contains automatic electronic controls for automatically controlling the sequence of operations illustrated in FIG. 29.

Before commencement of a cutting operation, the elements listed in FIG. 29 are positioned as indicated. When a supply roll is placed on the cradle the cutting machine may be activated. Initially, the rollers in the cradle and lead bed rotate in a reverse direction. This reverse phase is to tighten and position and centralize the supply roll 12 on the cradle 34. The cradle reverse trigger 418, in addition to reversing the direction of the rollers in the cradle and lead bed, also initiates the alignment sequence designated by numeral I in FIG. 4. The supply roll 12 is properly aligned in the cradle as previously described in connection with FIG. 5. After the cradle sensors, FIG. 26, sense the position of the supply roll and take the corrective actions required, the unroll sequence II begins with actuation of the rollers in all beds in the forward direction.

Figure 26:
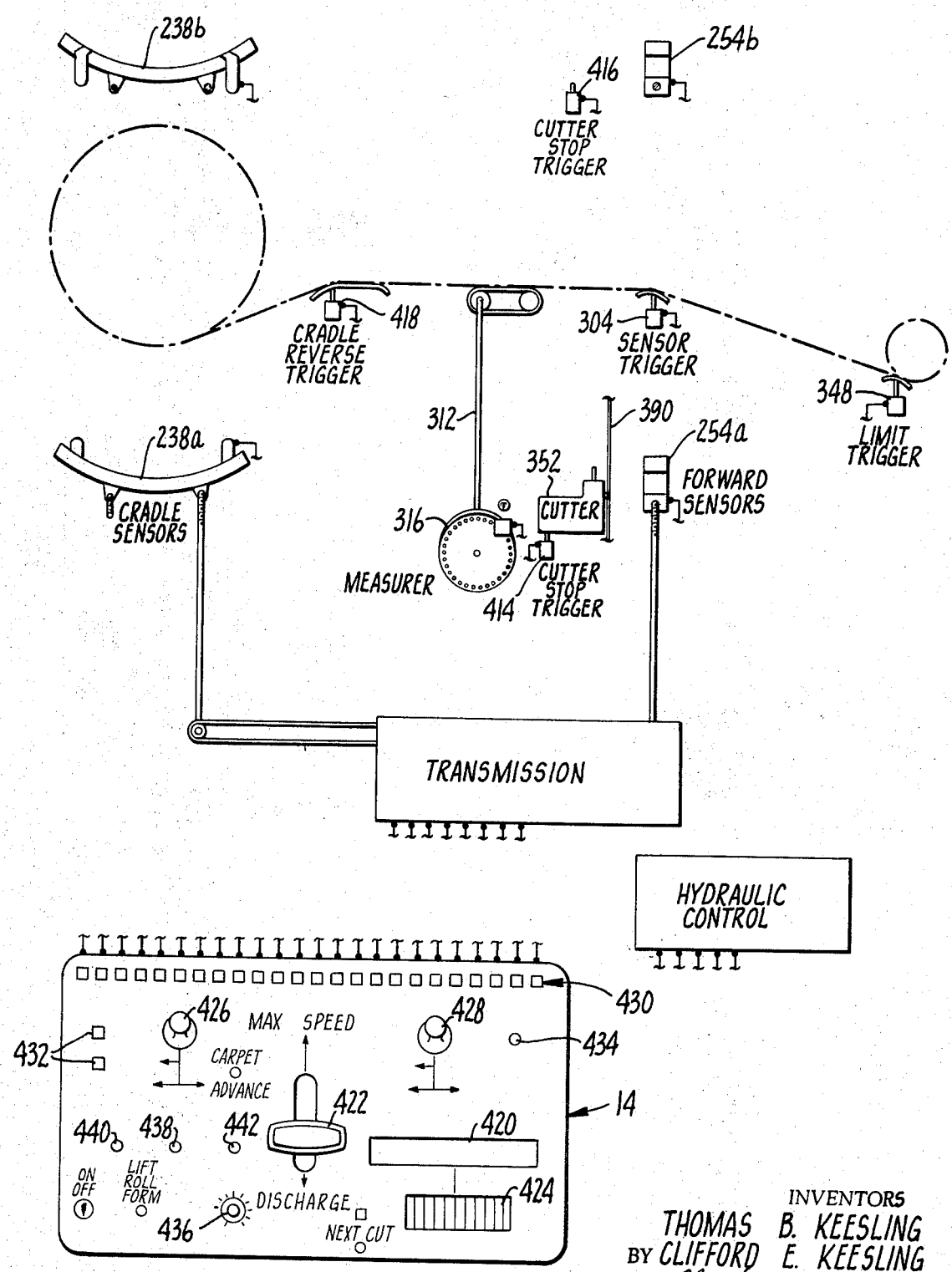
FIG. 26 is a schematic diagram of the principal electrically controlled elements of the cutting machine.

As the carpet is unrolled, the forward sensors, FIG. 26, which had partially converged during the alignment sequence I, are again activated, when the lead edge of the carpet hits the sensor trigger 304, FIG. 26. As previously described in connection with the description of FIG. 5, the supply roll is skewed to correct any off-center of the unrolled carpet. Just after passing under the eventual location of the pressure roller in the roll form, the lead edge of the carpet trips a roll-up trigger 348, FIG. 26. The roll-up trigger located a predetermined distance beyond the carpet position trigger causes all movement to stop and initiates lowering of the roll form 38. Upon reaching "full down" position the roll form actuates the roll form down trigger, starting *all* rollers in *reverse* rotation. The end of the carpet 13 retracts over the carpet position trigger stopping all roller rotation. All systems are "locked out" until the desired length of order roll 40 is put onto digital switches 424 and release button is pushed. The order roll size may also be fed to the switches 424 by a computer card reader or other memory device. It should be noted that the apparatus disclosed herein obtains a substantial improvement in reducing "coning" of the order roll as it is rolled up, and this improvement is caused by the fact that the shafts 26d on the roll form are somewhat flexible and are unsupported between their ends. Apparently, the shafts 26b tend to bow to some extent exerting greater pressure on the roll at its center than at its ends, thereby providing a roll-up action which reduces coning.

The measuring sequence III, FIG. 4, continues with the roll form raised when the order roll 14 is of sufficient size to continue to self-form without the aid of circular confinement and pressure. The speed of forward movement during this sequence can be manually controlled by a throttle control lever 422 on the central control panel 14, FIG. 26. Once the measured length on the indicator screen 420 is within a predetermined distance of the input length inserted on a length set dial 424, FIG. 26, the forward speed is automatically governed, decreasing the approach speed as the desired carpet length is obtained. When the numerical value on the indicator screen equals the value on the length set dial, all drive systems stop as the operation moves to the cutting sequence.

It must be noted that out measuring sequence II may be interrupted if it is necessary that the lead edge of the carpet from the supply roll be trimmed to square the edge or remove a damaged section. The throttle control lever 422 is placed in neutral (off) position upon observing that the portion of carpet to be removed is beyond the path of the cutting knife blade. The portion if the carpet to be removed can then be removed by placing both left and right cherry levers 426 and 428, FIG. 26, in trim position. Measuring sequence II may then be continued by advancing throttle control lever 422.

On the initiation of the cutting sequence IV, FIG. 4, the combs are extended to clamp the carpet firmly across the cutting slot. As previously described, the cutter carriage is activated and crosses the width of the cutting machine severing the carpet as illustrated in sequence IV, FIG. 4. After crossing the machine the cutter carriage trips the cutter stop-trigger, 414 or 416, in FIG. 26. In addition to cutting the power to the cutter carriage, the cutter stop-trigger initiates the roll-up sequence V, FIG. 4. In the roll-up sequence V, the hold-down combs are retracted and the clamp beam is raised. The drive to the cradle and lead rollers is then reversed while the drive to the gate, roll form (if not yet in a raised position) and discharge rollers is maintained in forward. Once the supply roll and the order roll are rolled up, the cutting machine systems return to their initial state at the commencement of sequence I.

If additional cuts are to be taken off supply roll 12, order roll 40 may be discharged onto suitabe conveying means while retaining supply roll, by placing cherry lever 426 only, in "order roll discharge" position. When it is desirable to discharge both "order roll" and "supply roll" throttle control lever 422 only is pulled toward operator which lowers both the cradle and the gate bed and both rolls drop into suitable conveyors.

It is apparent that certain sequences in the operation could be modified to suit the particular requirements of a user. For example, where it is contemplated that many cuts from the same supply roll are to be consecutively made, the roll-up sequence V may operate only on the order roll, leaving the supply roll as it existed after the cutting sequence IV. Rather than all systems returning to their state at the commencement of sequence I, the systems can return to the state at the commencement of sequence II since the supply roll is already aligned in the cradle. The operation may then continue in the above-described manner.

The suboperations that are not fully automatic are controlled by an operator at the central control 14, FIG. 1, FIG. 26. The operator supervises the various sequences to insure their proper performance. The light row 430, FIG. 26, at the top of the control panel indicates the circuits that are in an activated state during any particular sequence of the cutting operation. The leads shown above each light run to the various sensors in the carpet beds, the clutches in the transmission, and the solenoids in the hydraulic control. The two button lights 432 at the left of the control panel indicate pressure normal or pressure low in the hydraulic system. The button light 434 on the right of the control panel indicates whether power is on. The duration of the roll form power rotation is controlled by the roll form hold dial 436 which may be varied according to the type of material being cut.

In the event the supply roll may not contain sufficient material desired to be cut and where the machine is used for inventory analysis, the roll may be run through the cutting machine on a measure-only cycle when the button 438 for this cycle is depressed. The carpet may be completely run through the cutting machine, or if a sufficient roll remains in the cradle after measurement to reroll without the use of a roll form, the motor may be reversed by positioning the cherry lever 426 down and to the left. It is in this operation that the differential in bed speed for the cradle and lead bed over the discharge and gate bed is of importance. The former beds must progress at a greater speed than the latter to insure a compact reroll of the supply roll. The two positions in addition to the trim position for cherry lever 428 control the sensor retraction and advance independently of the automated sequence. The additional components on the control panel include a lamp test button 440 and a measure and cut button 442 for initiating the normal cycle. Variation of the controls will be inevitable with modification of the use or increase in automation of the cutting machine.

It is apparent the cutting machine may be modified in many respects from the detailed description of the preferred embodiment described without departing from the scope of the claims which define the limits of the invention.

I claim:

1. Apparatus for conveying a generally cylindrical object in a direction generally parallel to its length which comprises:
   an elongated concave cradle adapted to support a cylindrical object in a generally horizontal position with the length of said object generally parallel to the length of the cradle;
   conveying means in said cradle for rotating a cylindrical object on said cradle in a direction transverse to the length of the cradle; and
   skewing means for maintaining a cylindrical article in a skewed position on said cradle with the length of said article laterally inclined to the length of said cradle while said article is being rotated by said conveying means.

2. The apparatus of claim 1 in which said conveying means comprises a pair of independent conveyors spaced apart from each other longitudinally of said cradle for supporting longitudinally spaced apart portions of a cylindrical object, and said skewing means comprises means for operating said conveyors at different speeds.

3. The apparatus of claim 1 in which said skewing means comprises means mounted on said cradle for engaging one end of a cylindrical article while said article is rotating on said cradle.

4. Apparatus for alignment and unrolling of a supply roll of sheet material which comprises:
   a longitudinal cradle adapted to support a roll of sheet material in a horizontal position;
   conveyor means in said cradle for rotating a roll of sheet material in said cradle in a forward direction transverse of said cardle to unroll said roll;
   reverse drive means for said conveyor means for rotating a roll of sheet material in said cradle in a reverse direction transverse of said cradle to rotate said roll without unrolling said roll; and
   skewing means for maintaining said roll of material in a skewed position on said cradle with the length of said roll inclined to the length of said cradle while said reverse drive means is operating.

5. The apparatus of claim 4 in which said skewing means includes:
   first skewing means mounted at one end of said cradle movable toward the center of said cradle for skewing the adjacent end of said roll in said forward direction;
   second skewing means mounted at the other end of said cradle movable toward the center of said cradle for skewing the other end of said roll in said forward direction; and
   drive means for moving said first and second skewing means toward each other uniformly for conveying said roll to the center of said cradle.

6. The apparatus of claim 5 in which said conveyor means comprises first and second conveyors each covering about one-half of the length of said cradle and positioned adjacent to said first and second skewing means respectively, said reverse drive means includes means for operating said first and second conveyors at different speeds, and each of said first and second skewing means includes means connected to said reverse drive means for operating said second and first conveyors respectively faster than said first and second conveyors respectively.

7. The apparatus of claim 6 characterized further by the inclusion of first and second sensors laterally spaced from said cradle on the same sides of the center thereof as said first and second skewing means and uniformly movable toward each other in a direction parallel to the length of said cradlle for sensing the side edge of a sheet material partially unrolled from said cradle, and means for operating said first and second conveyors in said forward direction faster than said second and first conveyors, respectively, responsive to operation of said first and second sensors, respectively, whereby movemnt of said sensors toward each other aligns said sheet material perpendicular to the length of said cradle.

8. Apparatus for the automatic corrective alignment on a conveyor system of sheeting material unrolled from a centered supply roll comprising:
   (A) a longitudinal cradle bed into which said supply roll is placed between two bracketing cradle shoes, said cradle bed having a right and left portion;
   (B) a lead bed having a right and left portion onto which said sheeting material is unrolled from the supply roll, said lead bed located directly adjacent to said cradle bed such that a continuous conveyor system having a discharge end is formed;
   (C) a separate conveyor system in each of said right and left portions of said cradle bed and said lead bed;
   (D) drive means providing movement of said separate conveyor systems at independently variable rates;
   (E) forward sensors movably mounted at the outer sides of said conveyor system near the discharge end of the lead bed which coactively converge toward the center of said lead bed with said sensors individually activated on detection of the unrolled sheeting;
   (F) a trigger sensor which initiates the convergence of said forward sensors on detection of the lead edge of the sheeting material as it approaches the discharge end of the lead bed; and
   (G) a control circuit in which an activated forward sensor initiates a corrective differential movement in the two separate conveyor systems in both the cradle and the lead bed shifting the unrolled sheeting material away from the activated sensor.

9. The method of conveying a generally cylindrical object in a horizontal direction generally parallel to its length which comprises:
   moving a support member in a predetermined, generally horizontal direction;
   supporting a generally cylindrical object on said support member with the axis of said object generally horizontal and inclined at an acute angle to a plane perpendicular to said predetermined direction;
   rotating said generally cylindrical object about its own axis in rolling engagement with said support member; and
   supporting said support member against movement in a direction perpendicular to said predetermined direction.

10. Apparatus for formation of sheet material into a roll comprising:
    a conveyor having a discharge end for conveying sheet material along a discharge path in unrolled condition toward said discharge end;
    a plurality of rollers mounted above said conveyor adjacent to said discharge end defining a generally cylindrical conveyor path which extends upwardly from said discharge end of said discharge path and hence over said discharge path and back down to said discharge path whereby a sheet of material moving along said discharge path toward said discharge end will be rolled in said cylindrical path;
    means for moving at least a portion of said rollers upwardly away from said discharge path and upstream along said discharge path away from the discharge end thereof to increase the diameter of said cylindrical path with said portion of said rollers moving in the same direction along said path as the center of said roll moves as the diameter of said roll increases; and
    means for moving all of said rollers away from said discharge end of said path to permit a roll of material on said discharge path to move past said discharge end.

11. In a conveyor system for the carrying of flexible sheeting, apparatus for the formation of said sheeting into rolls comprising:
    (A) main support frame;
    (B) a discharge conveyor mounted on the support frame having a discharge end;
    (C) a gate arm attached to said support frame carrying a conveyor gate generally parallel to said discharge end;
    (D) means for raising the gate arm and conveyor gate into position adjacent to the discharge end of the discharge conveyor forming an upwardly inclined end-section to the conveyor;
    (E) a roll form arm above said discharge conveyor and attached to said support frame;
    (F) means for lowering the roll form arm to a lowered position adjacent to the inclined end section of said conveyor and raising said roll form arm to an elevated position; and
    (G) an arcuate conveyor mounted on said roll form arm generally parallel to said conveyor gate with said conveyor gate, the adjacent portion of said discharge conveyor and said arcuate conveyor in said lowered position defining a generally cylindrical pocket for forming a roll of material adjacent to said discharge end.

12. The apparatus of claim 11 characterized further by the inclusion of a weighted pressure roller suspended from said roll form arm on the opposite side of said arcuate conveyor from said discharge end with said pressure roller positioned to hold sheet material in engagement with said discharge conveyor adjacent to said cylindrical pocket.

13. In a conveyor apparatus for handling, measuring and cutting sheeting material an improved apparatus for measurement of the length to be severed comprising:
    (A) two drums spatially separated with parallel axis of rotation;
    (B) a flat thin belt encompassing the two drums, said belt and drums so attached to the conveyor apparatus that a portion of the thin belt extending between said two drums contacts the under surface of the sheeting material conveyed by the conveyor apparatus;
    (C) a wheel mounted to the conveyor apparatus having equidistant physical disturbances around the wheel at a selected radius;
    (D) connecting means connecting the axis of rotation of one of the drums to the axis of rotation of the wheel;
    (E) a sensor fixed to the conveyor apparatus at one side of the wheel for detecting said physical disturbances on the wheel;
    (F) a pulse-adder circuit which arithmetically sums an electrical pulse output from the sensor.

14. The apparatus for measurement of the length of sheeting material to be severed contained in claim 13 further characterized by the additional improvements comprising:
    (A) a weighted tracking wheel mounted on the conveyor apparatus to rest on the upper surface of the sheeting material directly above the thin belt to press the sheeting material firmly against the thin belt;
    (B) an idler roller attached to the conveyor apparatus between the two drums in peripheral contact with the portion of the thin belt extending between said two drums directly under the tracking wheel preventing deformation of the thin belt from the applied weight of the tracking wheel.

15. In apparatus for measuring and cutting carpet having a central measuring and cutting station, input conveyor means for conveying carpet toward said station and delivery coveyor means for conveying carpet away from said station, the improvement comprising:
    (A) a supply cradle for supporting and unrolling a roll of carpet with said supply cradle connected to said apparatus adjacent to said input cardle; and
    (B) pivotal support means for said supply cradle for supporting said cradle in an upper carpet supporting position and pivoting said support cradle downwardly away from said input conveyor for dumping a roll of carpet out of said supply cradle.

References Cited

UNITED STATES PATENTS

| | | | |
|---|---|---|---|
| 2,441,544 | 5/1948 | Longfield | 242—78.7 |
| 2,706,094 | 4/1955 | Dyken | 242—66 |
| 3,052,073 | 9/1962 | Johansen et al. | |
| 3,228,620 | 1/1966 | Lee | 242—56 |

LEONARD D. CHRISTIAN, Primary Examiner

U.S. Cl. X.R.

242—66